(12) United States Patent
Matsuda et al.

(10) Patent No.: US 9,979,849 B2
(45) Date of Patent: May 22, 2018

(54) COMMUNICATION PATH SELECTION FOR REMOTE CONTROL SYSTEM OF AN IMAGE PROCESSING APPARATUS, REMOTE CONTROL AND COMMUNICATION PATH SELECTION METHOD, AND NON-TRANSITORY COMPUTER-READABLE RECORDING MEDIUM ENCODED WITH REMOTE CONTROL AND COMMUNICATION PATH SELECTION PROGRAM

(71) Applicant: Konica Minolta, Inc., Tokyo (JP)

(72) Inventors: Hideyuki Matsuda, Hirakata (JP); Jun Shiraishi, Toyokawa (JP); Yoichi Kurumasa, Toyokawa (JP); Mie Kawabata, Toyokawa (JP); Hiroyuki Ohno, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 15/250,037

(22) Filed: Aug. 29, 2016

(65) Prior Publication Data

US 2017/0064121 A1  Mar. 2, 2017

(30) Foreign Application Priority Data

Sep. 2, 2015  (JP) .................................. 2015-172444

(51) Int. Cl.
*H04N 1/00*  (2006.01)
*H04N 1/327*  (2006.01)
(Continued)

(52) U.S. Cl.
CPC ..... *H04N 1/00973* (2013.01); *H04N 1/00307* (2013.01); *H04N 1/32507* (2013.01);
(Continued)

(58) Field of Classification Search
None
See application file for complete search history.

(56) References Cited

U.S. PATENT DOCUMENTS

2012/0081738 A1   4/2012   Seki
2012/0257245 A1*  10/2012  McCoog ............... G06F 3/1204
                                                358/1.15
(Continued)

FOREIGN PATENT DOCUMENTS

JP   H09-107426 A    4/1997
JP   2006-227795 A   8/2006
(Continued)

OTHER PUBLICATIONS

Japan Patent Application No. 2015-172444; Notice of Ground of Rejection; dated Nov. 21, 2017; 7 pages.

*Primary Examiner* — Andrew H Lam
(74) *Attorney, Agent, or Firm* — Baker & Hostetler LLP

(57) ABSTRACT

A hardware processor included in an image processing apparatus establishes a communication path with remote operation devices, selects one of the established communication paths as a valid path, executes a process in accordance with a remote operation command received via the valid path, in response to establishment of new communication paths different from the valid path, sets the new communication paths as waiting paths to which sequence numbers are supplied in a chronological order of establishment of the communication paths, determines whether a same waiting path to which a remote operation device that is the same as a remote operation device connected to the valid path is connected is present, and in the case where the same waiting path is present, in response to disconnection of the valid path, selects the same waiting path as a valid path regardless of the sequence numbers supplied to the waiting paths.

20 Claims, 10 Drawing Sheets

(51) Int. Cl.
*H04N 1/32* (2006.01)
*H04W 84/12* (2009.01)
(52) U.S. Cl.
CPC . *H04N 1/32765* (2013.01); *H04N 2201/0039* (2013.01); *H04N 2201/0041* (2013.01); *H04N 2201/0055* (2013.01); *H04N 2201/0075* (2013.01); *H04N 2201/0094* (2013.01); *H04W 84/12* (2013.01)

(56) References Cited

U.S. PATENT DOCUMENTS

| | | | | |
|---|---|---|---|---|
| 2014/0002851 | A1* | 1/2014 | Smith | G06F 3/1204 358/1.15 |
| 2015/0029529 | A1* | 1/2015 | Oda | H04N 1/00352 358/1.13 |
| 2015/0077787 | A1 | 3/2015 | Nishimura et al. | |

FOREIGN PATENT DOCUMENTS

| | | |
|---|---|---|
| JP | 2012-079219 A | 4/2012 |
| JP | 2015-60410 A | 3/2015 |
| JP | 2015-061088 A | 3/2015 |

* cited by examiner

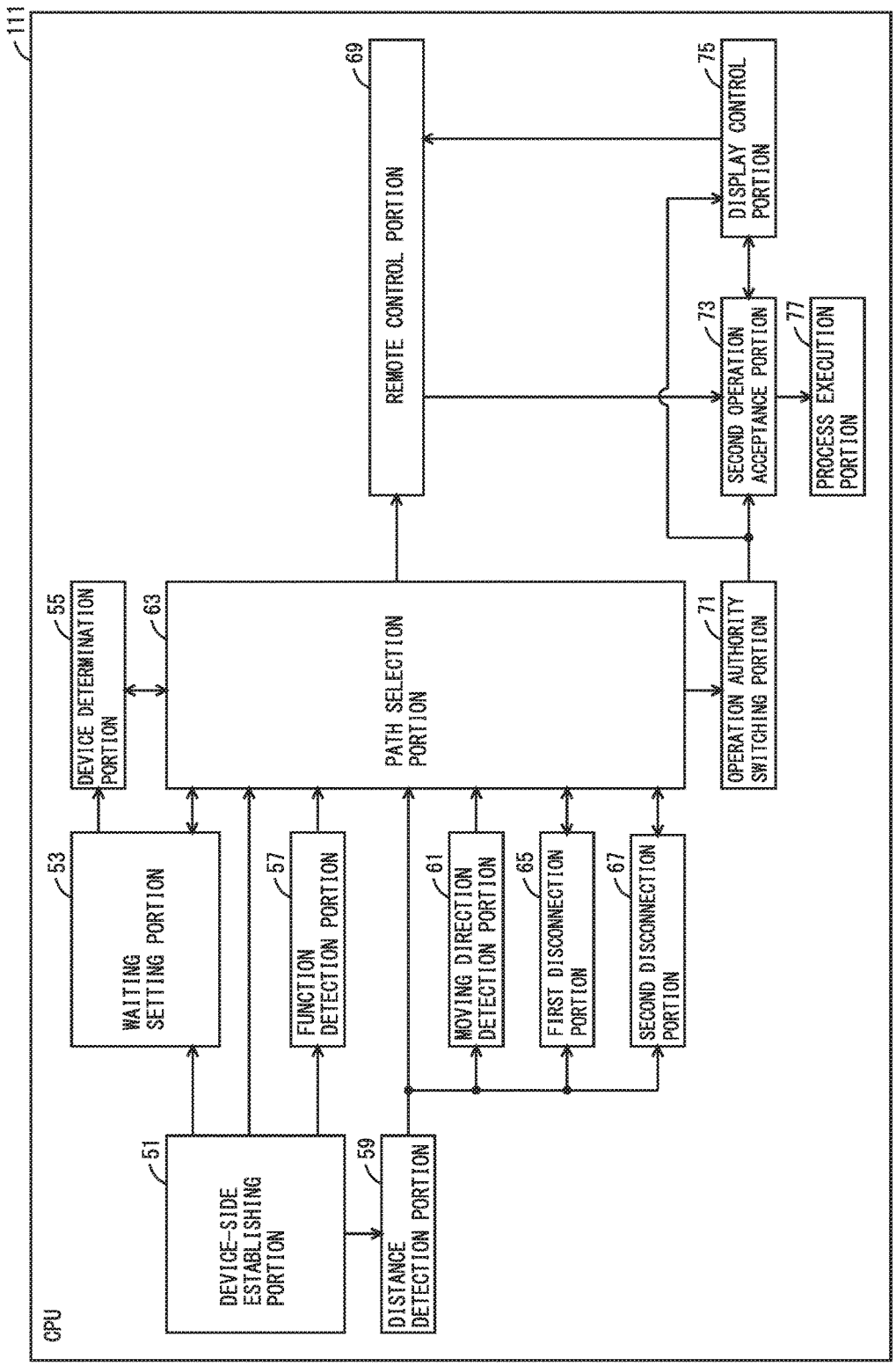
F I G. 5

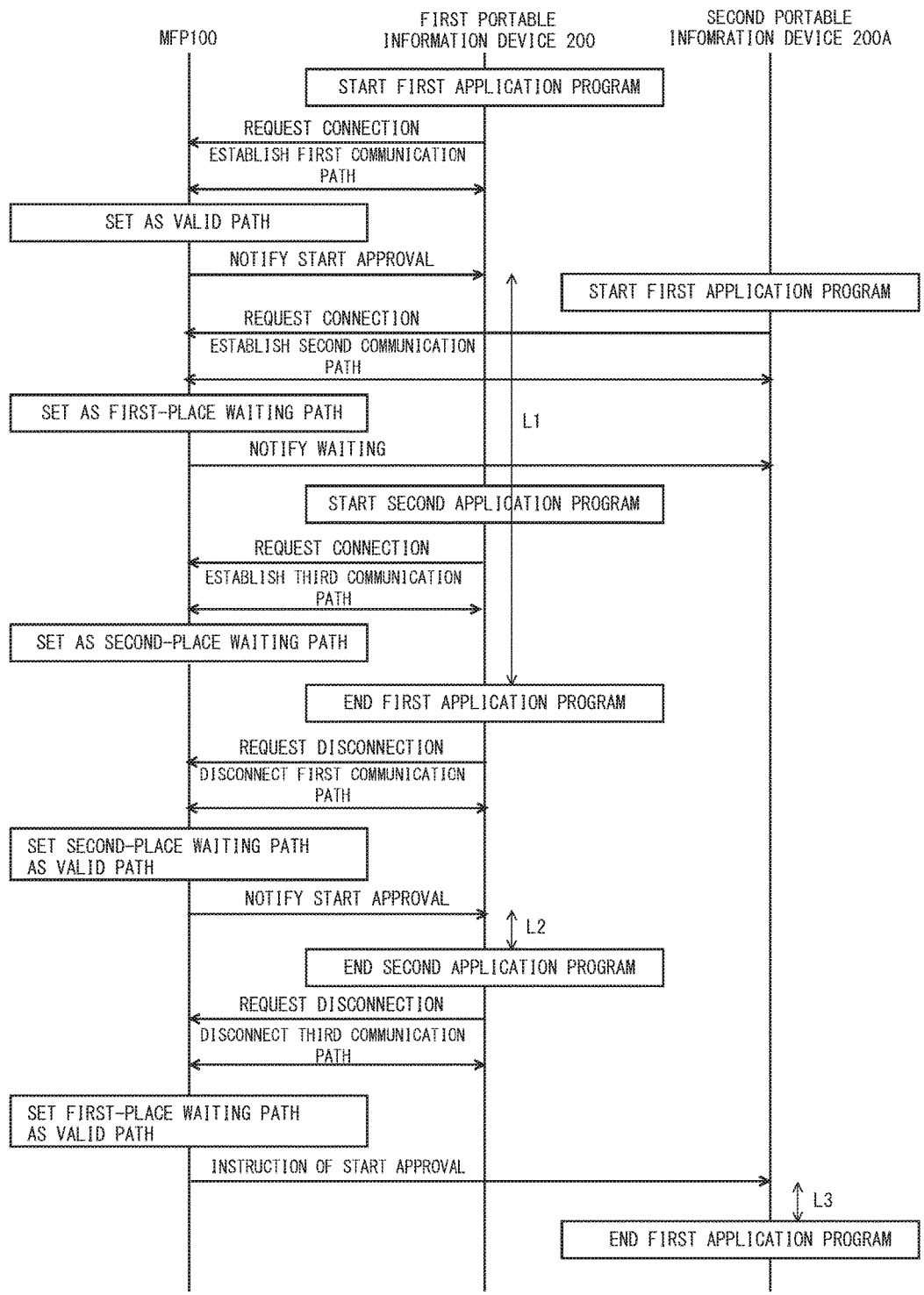

COMMUNICATION PATH SELECTION FOR REMOTE CONTROL SYSTEM OF AN IMAGE PROCESSING APPARATUS, REMOTE CONTROL AND COMMUNICATION PATH SELECTION METHOD, AND NON-TRANSITORY COMPUTER-READABLE RECORDING MEDIUM ENCODED WITH REMOTE CONTROL AND COMMUNICATION PATH SELECTION PROGRAM

CROSS-REFERENCE TO RELATED APPLICATIONS

This application is entitled to and claims the benefit of Japanese Patent Application No. 2015-172444 filed with the Japan Patent Office on Sep. 2, 2015, the entire contents of which are hereby incorporated by reference.

BACKGROUND OF THE INVENTION

Field of the Invention

The present invention relates to a remote control system, an image processing apparatus, a remote control method, and a non-transitory computer-readable recording medium encoded with a remote control program. More specifically, the present invention relates to a remote control system that includes a remote operation device and an image processing apparatus remotely controlled by the remote operation device, the image processing apparatus, a remote control method performed by the image processing apparatus, and a non-transitory computer-readable recording medium encoded with a remote operation program.

Description of the Related Art

A technique for remotely operating an image processing apparatus represented by an Multi Function Peripheral (hereinafter referred to as an MFP) by a portable information device such as a smart phone and a tablet terminal has been known. It is possible to connect the portable information device to the MFP to remotely operate the MFP by the portable information device. In this case, the portable information device and the MFP are connected to each other by wireless communication. As a technique used in the case where this wireless communication is disconnected, an image processing apparatus that measures a distance from the portable terminal device, compares the distance with a first distance set in advance and a second distance set in advance and smaller than the first distance when the wireless communication with the portable terminal device is disconnected, displays an operation screen displayed in display means of the portable terminal device in the case where the distance from the portable terminal device is the second distance or less, displays a limited log-in screen in which only a user of the portable terminal device can log in the case where the distance exceeds the second distance and is the first distance or less, and displays a general log-in screen in the display means in the case where the distance exceeds the first distance, is described in Japanese Patent Laid-Open No. 2015-60410, for example.

On the one hand, in the case where receiving connection requests for the remote operation from a plurality of portable information devices, the MFP is remotely operated by the portable information device, which has transmitted the connection request earliest, and sets the portable information devices, which have transmitted the connection requests later than the earliest transmission, in a waiting line. Therefore, the MFP is remotely operated by the plurality of portable information devices one by one in a chronological order of transmission of the connection requests. Specifically, after the wireless communication with the portable information device that is remotely operating ends, the MFP is remotely operated by the portable information device placed next in the waiting line.

However, there is a case where a plurality of application programs for remotely operating the MFP are executed in the portable information device. The user sometimes allows the portable information device to execute a second application program to remotely continuously operate the MFP after allowing the portable information device to execute a first application program to remotely operate the MFP. In this case, in the case where another portable information device is set in the waiting line at a time point at which the second application program is executed for the remote operation of the MFP, there is a problem that the user cannot continuously perform the operation since another portable information device is given priority to remotely operate the MFP.

SUMMARY OF THE INVENTION

According to one aspect of the present invention, a remote control system that includes an image processing apparatus and a plurality of remote operation devices capable of remotely operating the image processing apparatus, wherein a hardware processor of each of the plurality of remote operation devices establishes a communication path with the image processing apparatus, remotely operates the image processing apparatus by executing a first application program and transmitting a remote operation command using the established communication path, and remotely operates the image processing apparatus by executing a second application program and transmitting a remote operation command using the established communication path different from the communication path used for the first application program, and a hardware processor included in the image processing device establishes a communication path with any of the plurality of remote operation devices, selects any one of the one or more established communication paths as a valid path, executes a process in accordance with a remote operation command received via the valid path, in response to establishment of new communication paths different from the valid path with the valid path being selected, sets the new communication paths as waiting paths to which sequence numbers are supplied in a chronological order of establishment of the communication paths, in the case where the plurality of waiting paths are present, determines whether a same waiting path to which a remote operation device that is the same as a remote operation device connected to the valid path is connected is present among the plurality of waiting paths, and in the case where it is determined that the same waiting path is present, in response to disconnection of the valid path, selects the same waiting path as a valid path regardless of the sequence numbers supplied to the plurality of waiting paths.

According to another aspect of the present invention, an image processing apparatus capable of being remotely operated by a plurality of remote operation devices, wherein a hardware processor included in the image processing apparatus establishes a communication path with any of the plurality of remote operation devices, selects any one of the one or more established communication paths as a valid path, executes a process in accordance with a remote operation command received via the valid path, in response to establishment of new communication paths different from the valid path with the valid path being selected, sets the new communication paths as waiting paths to which sequence numbers are supplied in a chronological order of establishment of the communication paths, in the case where the plurality of waiting paths are present, determines whether a same waiting path to which a remote operation device that is the same as a remote operation device connected to the valid path is connected is present among the plurality of waiting paths, and in the case where it is determined that the same waiting path is present, in response to disconnection of the valid path, selects the same waiting path as a valid path regardless of the sequence numbers supplied to the plurality of waiting paths.

According to yet another aspect of the present invention, a remote control method performed by an image processing apparatus capable of being remotely operated by a plurality of remote operation devices, includes a device-side establishing step of establishing a communication path with any of the plurality of remote operation devices, a path selection step of selecting any one of one or more communication paths established in the device-side establishing step as a valid path, a remote control step of executing a process in accordance with a remote operation command received via the valid path, a waiting setting step of, with a valid path being selected in the path selection step, in response to establishment of new communication paths different from the valid path in the device-side establishing step, setting the new communication paths as waiting paths to which sequence numbers are supplied in a chronological order of establishment of the communication paths, and a device determination step of, in the case where a plurality of waiting paths set in the waiting setting step are present, determining whether a same waiting path to which a remote operation device that is the same as a remote operation device connected to the valid path is connected is present among the plurality of waiting paths, wherein the path selection step includes, in the case where it is determined that the same waiting path is present, in response to disconnection of the valid path, selecting the same waiting path as a valid path regardless of the sequence numbers supplied to the plurality of waiting paths.

According to yet another aspect of the present invention, a non-transitory computer-readable recording medium encoded with a remote control program executed by a computer controlling an image forming apparatus which is capable of being remotely operated by a plurality of remote operation devices, wherein the remote control program causes the computer to execute a device-side establishing step of establishing a communication path with any of the plurality of remote operation devices, a path selection step of selecting any one of one or more communication paths established in the device-side establishing step as a valid path, a remote control step of executing a process in accordance with a remote operation command received via the valid path, a waiting setting step of, with a valid path being selected in the path selection step, in response to establishment of new communication paths different from the valid path in the device-side establishing step, setting the new communication paths as waiting paths to which sequence numbers are supplied in a chronological order of establishment of the communication paths; and a device determination step of, in the case where the plurality of waiting paths set in the waiting setting step are present, determining whether a same waiting path to which a remote operation device that is the same as a remote operation device connected to the valid path is connected is present among the plurality of waiting paths, and the path selection step includes, in the case where it is determined that the same waiting path is present, in response to disconnection of the valid path, selecting the same waiting path as a valid path regardless of the sequence numbers supplied to the plurality of waiting paths.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 5 is a block diagram showing one example of functions of a CPU included in the MFP in the present embodiment;

FIG. 10 is a diagram for explaining a specific example of the remote control process executed by the MFP in a chronological order.

DESCRIPTION OF THE PREFERRED EMBODIMENTS

Figure 1:
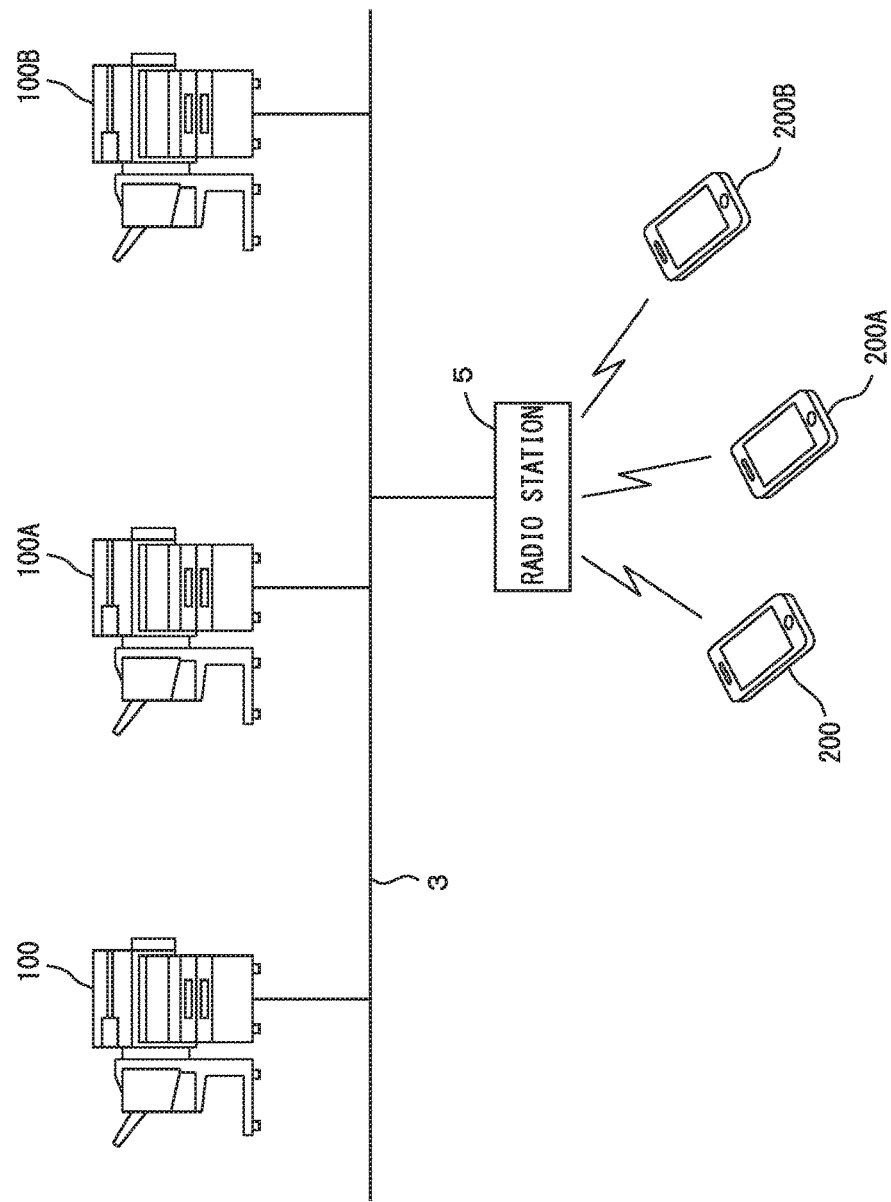
FIG. 1 is a diagram showing an overview of a remote control system in one embodiment of the present invention.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing an overview of a remote control system in one embodiment of the present invention. Referring to FIG. 1, the remote control system 1 includes each of MFPs 100, 100A, 100B that functions as an image processing apparatus, a radio station 5, and each of portable information devices 200, 200A, 200B that functions as a remote operation device capable of remotely controlling any one of the MFPs 100, 100A, 100B. The MFPs (Multi Function Peripheral) 100, 100A, 100B, and the radio station 5 are connected to a network 3. The portable information devices 200, 200A, 200B are connected to the network 3 via the radio station 5.

The network 3 is a Local Area Network (LAN), either wired or wireless. Further, the network 3 is not limited to a LAN but may be a Wide Area Network (WAN), a Public Switched Telephone Network (PSTN), or the Internet.

The portable information devices 200, 200A, 200B are computers such as smart phones and PDAs (Personal Digital Assistants) carried and used by users. Each of the portable information devices 200, 200A, 200B has the same hardware configuration and functions. Thus, the portable information device 200 will be taken as an example in the description here, unless otherwise specified. Here, the portable information device 200 is a smart phone and has a wireless LAN function and a call function. Thus, the portable information device 200 thereby can connect to a mobile phone network to make a call by communicating with a mobile phone base station by radio.

In the remote control system 1 in the present embodiment, the respective portable information devices 200, 200A, 200B remotely operate the MFPs 100, 100A, 100B. In this case, each of the portable information devices 200, 200A, 200B functions as a remote operation device that remotely operates the MFPs 100, 100A, 100B, and each of the MFPs 100, 100A, 100B functions as a remote control device remotely operated by any of the portable information devices 200, 200A, 200B. A remote operation program for remotely operating the MFPs 100, 100A, 100B is installed in each of the portable information devices 200, 200A, 200B. The remote operation program is an application program common among the MFPs 100, 100A, 100B and compatible with any one of the MFPs 100, 100A, 100B. On the one hand, a remote control program that is remotely operated by the portable information device 200 and executes a process is installed in the MFP 100. The case where the portable information device 200 remotely operates the MFP 100 is described here as an example.

While the MFPs 100, 100A, 100B respectively have different configurations and executable functions from one another in the remote control system 1 described in the present embodiment, the MFPs 100, 100A, 100B have the common basic configuration. The basic configuration of the MFP will be described here, and the MFP 100 will be described representatively.

Figure 2:
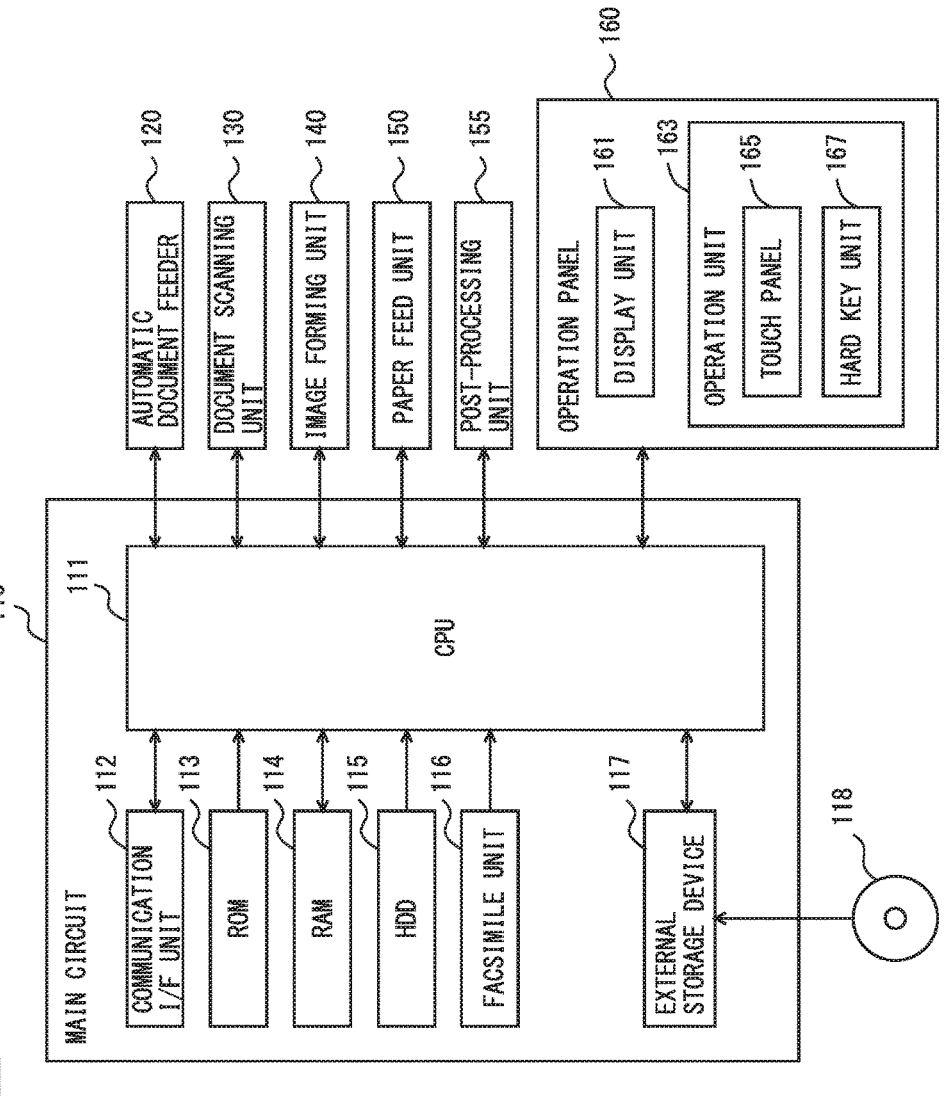
FIG. 2 is a block diagram showing one example of an outline of a basic configuration of an MFP.

FIG. 2 is a block diagram showing one example of the outline of the basic configuration of the MFP 100. Referring to FIG. 2, the MFP 100 includes a main circuit 110, a document scanning unit 130 for scanning a document, an automatic document feeder 120 for conveying a document to the document scanning unit 130, an image forming unit 140 for forming an image on a sheet of paper or other medium based on image data scanned and output by the document scanning unit 130, a paper feed unit 150 for supplying a sheet of paper to the image forming unit 140, a post-processing unit 155 for processing a sheet of paper on which an image is formed, and an operation panel 160 serving as a user interface.

The post-processing unit 155 performs a sorting process of sorting and discharging one or more sheets of paper on which images have been formed by image forming unit 140, a hole-punching process of punching the sheets, and a stapling process of stapling the sheets.

The main circuit 110 includes a CPU 111, a communication interface (I/F) unit 112, a ROM 113, a RAM 114, a hard disk drive (HDD) 115 as a mass storage, a facsimile unit 116, and an external storage device 117 on which a compact disc ROM (CD-ROM) 118 is mounted. The CPU 111 is connected to the automatic document feeder 120, the document scanning unit 130, the image forming unit 140, the paper feed unit 150, the post-processing unit 155, and the operation panel 160 to control the entire MFP 100.

The ROM 113 stores a program executed by the CPU 111 or data necessary for execution of the program. The RAM 114 is used as a work area when the CPU 111 executes the program. Further, the RAM 114 temporarily stores image data continuously transmitted from document scanning unit 130.

The communication I/F unit 112 is an interface for connecting the MFP 100 to the network 3. The CPU 111 communicates with the other MFP 100A, 100B or the portable information devices 200, 200A, 200B via the communication I/F unit 112. Further, the communication I/F unit 112 can communicate with a computer connected to the internet via the network 3.

The facsimile unit 116 is connected to public switched telephone networks (PSTN), and transmits facsimile data to or receives facsimile data from the PSTN. The facsimile unit 116 stores the received facsimile data in the HDD 115, or outputs the data to the image forming unit 140. The image forming unit 140 prints the facsimile data received by facsimile unit 116 on paper. Further, the facsimile unit 116 converts the data stored in the HDD 115 into facsimile data, and transmits the facsimile data to a facsimile machine connected to the PSTN.

The external storage device 117 is mounted with the CD-ROM 118. The CPU 111 is capable of accessing the CD-ROM 118 via the external storage device 117. The CPU 111 loads the program recorded in the CD-ROM 118, which is mounted on the external storage device 117, into the RAM 114 for execution. It is noted that the medium for storing a program executed by the CPU 111 is not limited to the CD-ROM 118. It may be an optical disc (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

Further, the program executed by the CPU 111 is not limited to the program recorded in the CD-ROM 118, and the program stored in the HDD 115 may be loaded into the RAM 114 for execution. In this case, another computer connected to the network 3 may rewrite the program stored in the HDD 115 of the MFP 100, or may additionally write a new program therein. Further, the MFP 100 may download a program from another computer connected to the network 3, and store the program in the HDD 115. The program referred to here includes not only a program directly executable by the CPU 111 but also a source program, a compressed program, an encrypted program and the like.

The operation panel 160 is provided on an upper surface of the MFP 100. The operation panel 160 includes a display unit 161 and an operation unit 163. The display unit 161 is a Liquid Crystal Display (LCD), for example, and displays an instruction menu for a user, information about acquired image data and the like.

The operation unit 163 includes a touch panel 165 and a hard key unit 167. The touch panel 165 is a capacitance type. The touch panel 165 is not limited to the capacitance type, and another type such as a resistive film type, a surface acoustic wave type, an infrared type, and an electromagnetic induction type can be used.

The touch panel 165 detects a position designated by the user on a detection surface. The detection surface of the touch panel 165 is provided with its detection surface being superimposed on an upper surface or a lower surface of the display unit 161. The size of the detection surface of the touch panel 165 and the size of the display surface of the display unit 161 are the same. Therefore, the coordinate system of the display surface and the coordinate system of the detection surface are the same. The touch panel 165 detects the position designated by the user on the display surface of the display unit 161 on the detection surface, and outputs a set of coordinates of the detected position to the CPU 111. Because the coordinate system of the display surface and the coordinate system of the detection surface are the same, the set of coordinates output by the touch panel 165 can be replaced with the set of coordinates of the display surface. Hereinafter, the set of coordinates, which is detected on the detection surface and output by the touch panel 165 when the user gives a designation on the display surface of the display unit 161, is also referred to as the set of coordinates of the display surface of the display unit 161.

The touch panel 165 is a multi-touch screen panel. Therefore, when the user simultaneously designates a plurality of positions on the display surface of the display unit 161 with a plurality of fingers, the touch panel 165 detects the plurality of positions designated by the user on the display surface of the display unit 161 on the detection surface, and outputs a plurality of sets of coordinates respectively indicating the plurality of detected positions to the CPU 111.

The hard key unit 167 includes a plurality of hard keys. The hard keys are contact switches, for example. The touch panel 165 detects a position designated by the user on the display surface of the display unit 161. In the case where operating the MFP 100, the user is likely to be in an upright attitude, so that the display surface of the display unit 161, an operation surface of the touch panel 165, and the hard key unit 167 are arranged to face upward. This is for the purpose of enabling the user to easily view the display surface of the display unit 161 and easily give an instruction on the operation unit 163 with his or her fingers.

Figure 3:
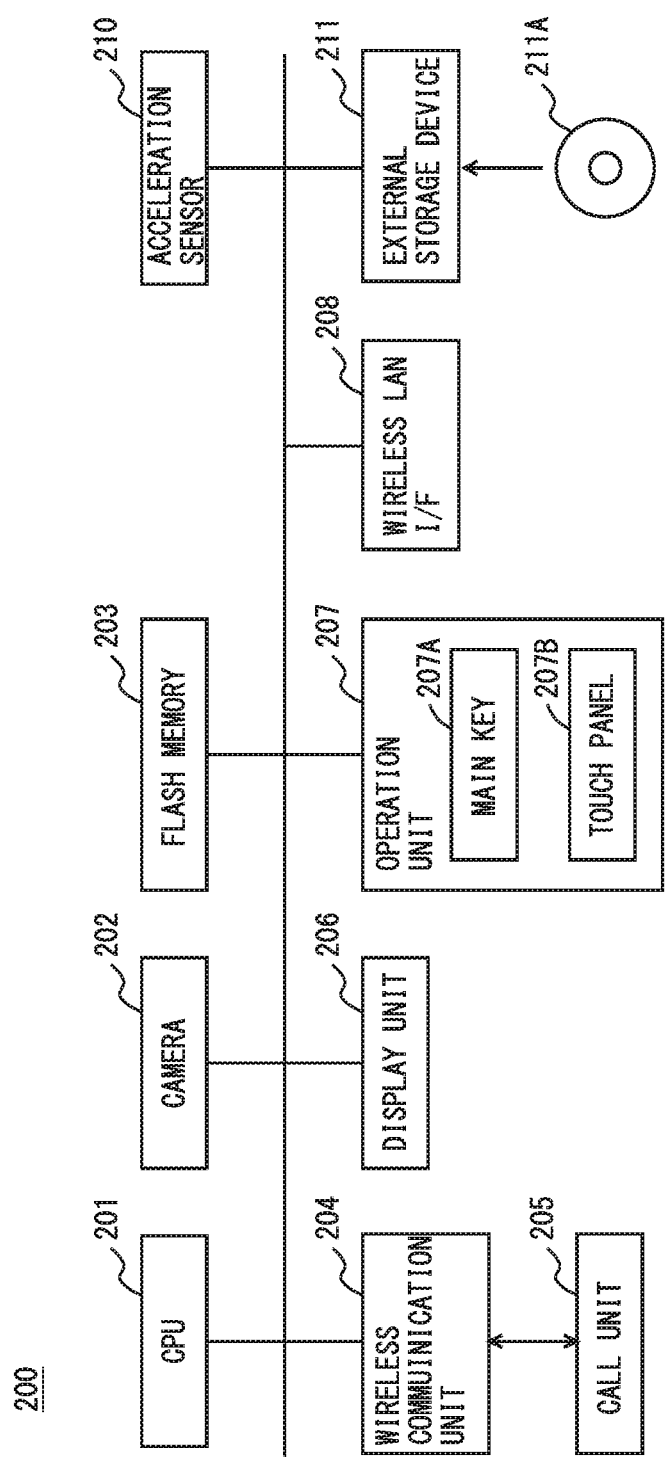
FIG. 3 is a block diagram showing one example of an outline of a configuration of a portable information device.

FIG. 3 is a block diagram showing one example of an outline of the configuration of the portable information device. Referring to FIG. 3, the portable information device 200 in the present embodiment includes a CPU 201 for controlling the entire portable information device 200, a camera 202, a flash memory 203 for storing data in a nonvolatile manner, a radio communication unit 204 connected to a call unit 215, a display unit 206 for displaying information, an operation unit 217 for accepting an operation by the user, a wireless LAN interface (I/F) 208, an acceleration sensor 210, and an external storage device 211.

The display unit 206 is a display device such as a liquid crystal display (LCD) and an organic ELD and displays an image. The operation unit 207 includes a main key 207A and a touch panel 207B. The touch panel 207B is a capacitance type. The touch panel 207B is not limited to the capacitance type, and another type such as a resistive film type, a surface acoustic wave type, an infrared type, and an electromagnetic induction type can be used.

The touch panel 207B detects a position designated by the user on the detection surface. The touch panel 165 is provided with its detection surface being superimposed on an upper surface or a lower surface of the display unit 206. The size of the detection surface of the touch panel 207B and the size of the display surface of the display unit 206 are the same. Therefore, the coordinate system of the display surface and the coordinate system of the detection surface are the same. The touch panel 207B detects a position designated by the user on the display surface of the display unit 206 on the detection surface, and outputs a set of coordinates of the detected position to the CPU 201. Because the coordinate system of the display surface and the coordinate system of the detection surface are the same, the set of coordinates output by the touch panel 207B can be replaced with the set of coordinates of the display surface. Hereinafter, the set of coordinates, which is detected on the detection surface and output by the touch panel 207B when the user gives a designation on the display surface of the display unit 206, are also referred to as the set of coordinates of the display surface of the display unit 206.

The touch panel 207B is a multi-touch screen panel. Therefore, when the user simultaneously designates a plurality of positions with a plurality of fingers on the display surface of the display unit 206, the touch panel 207B detects the plurality of positions designated by the user on the display surface of the display unit 206 on the detection surface, and outputs a plurality of sets of coordinates respectively indicating the plurality of detected positions to the CPU 201.

The camera 202 includes a lens and an optoelectronic transducer and forms an image of light collected by the lens on the optoelectronic transducer. The optoelectronic transducer transduces the received light and outputs the image data to the CPU 201. The optoelectronic transducer is a CMOS (Complementary Metal Oxide Semiconductor) sensor or a CCD (Charge Coupled Device) sensor, for example.

The radio communication unit 204 communicates by radio with the mobile phone base station connected to a telephone communication network. The radio communication unit 204 connects the portable information device 200 to the telephone communication network to enable a call using the call unit 205. The radio communication unit 204 decodes a voice signal obtained by demodulating a radio signal received from the mobile phone base station and outputs the decoded signal to the call unit 205. Further, the radio communication unit 204 encodes voice input from the call unit 205 and transmits the encoded signal to the mobile phone base station. The call unit 205 includes a microphone and a speaker. The voice input from the radio communication unit 204 is output from the speaker, and the voice input from the microphone is output to the radio communication unit 204. Further, the radio communication unit 204 is controlled by the CPU 201 and connects the portable information device 200 to an email server to transmit and receive emails.

The wireless LAN I/F 208 is an interface that communicates with the radio station 5 to connect the portable information device 200 to the network 3. The respective IP (Internet Protocol) addresses of the MFP 100, 100A, 100B are registered in the portable information device 200, so that the portable information device 200 can communicate with the MFPs 100, 100A, 100B to transmit and receive data. While the case where the portable information device 200 uses wireless LAN I/F 208 to communicate with the MFPs 100, 100A, 100B is described as an example in the present embodiment, other communication methods may be used for communication. Specifically, in the case where the portable information devices 200 and the MFPs 100, 100A, 100B are equipped with a short-range wireless device such as Bluetooth (registered trademark), the portable information device 200 may perform one-to-one communication with any of the MFPs 100, 100A, 100B.

The flash memory 203 stores a program executed by the CPU 201 or data necessary to execute the program. The CPU 201 loads the program recorded in the flash memory 203 into the RAM included in the CPU 201 for execution.

The acceleration sensor 210 is a three-axis acceleration sensor that measures acceleration in three directions of an X axis, a Y axis and a Z axis that are orthogonal to one another. The acceleration sensor 210 outputs the detected acceleration to the CPU 201.

The external storage device 211 is removably attached to the portable information device 200. A CD-ROM 211A storing the remote operation program can be mounted on the external storage device 211. The CPU 201 can access the CD-ROM 211A via the external storage device 211. The CPU 201 can load the remote operation program recorded in the CD-ROM 211A mounted on the external storage device 211 into the RAM included in the CPU 201 for execution.

The program recorded in the flash memory 203 or the CD-ROM 210A has been described as a program executed by the CPU 201. However, another computer connected to the network 3 may rewrite the program stored in flash memory 203 or additionally write a new program. Further, the portable information device 200 may download a program from another computer connected to the network 3. The program referred to here includes not only a program directly executable by the CPU 201 but also a source program, a compressed program, an encrypted program and the like.

The program executed by the CPU 201 may be stored not only in the CD-ROM 211A but also in another medium such as an optical disk (MO/MD/DVD), an IC card, an optical card, and a semiconductor memory such as a mask ROM, an EPROM, and an EEPROM.

Figure 4:
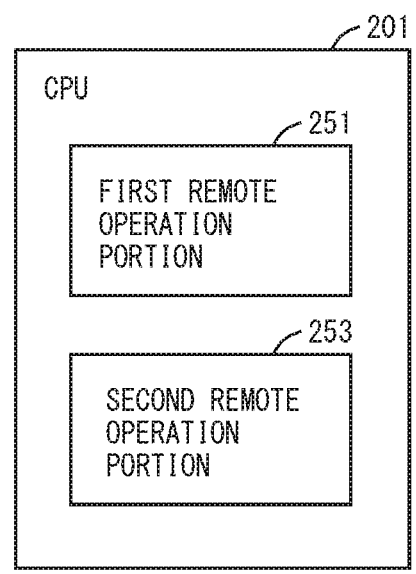
FIG. 4 is a block diagram showing one example of an outline of functions of a CPU included in the portable information device in the present embodiment.

FIG. 4 is a block diagram showing one example of the outline of the functions of the CPU included in the portable information device in the present embodiment. The functions shown in FIG. 4 are the functions formed in the CPU 201 when the CPU 201 included in the portable information device 200 executes the remote operation program stored in the flash memory 203 or the CD-ROM 211A. Referring to FIG. 4, the CPU 201 includes a first remote operation portion 251 and a second remote operation portion 253.

Each of the first remote operation portion 251 and the second remote operation portion 253 is a task formed in the CPU 201 when the CPU 201 executes an application program for remotely operating the MFP 100. Each of the first remote operation portion 251 and the second remote operation portion 253 establishes a communication path with the remote control device, which is the target of the remote operation. Specifically, if the user operates the operation unit 207 to designate any of the MFPs 100, 100A, 100B as the target remote control device for the remote operation, each of the first remote operation portion 251 and the second remote operation portion 253 controls the wireless LAN I/F 208 to transmit a connection request to the remote control device, and establishes a communication path with the remote control device. The case where the user designates the MFP 100 as the remote control device will be described here as an example. In this case, each of the first remote operation portion 251 and the second remote operation portion 253 establishes a communication path with the MFP 100. The communication path established by the first remote operation portion 251 with the MFP 100, and the communication path established by the second remote operation portion 253 with the MFP 100 are different from each other.

The application program executable by the CPU 201 includes a first application program and a second application program. The first remote operation portion 251 is treated as a task formed in the CPU 201 when the CPU 201 executes the first application program, and the second remote operation portion 253 is treated as a task formed in the CPU 201 when the CPU 201 executes the second application program.

The first application program is a program for remotely operating the MFP 100 with no operation of the operation panel 160 of the MFP 100 but with an operation of the portable information device 200 by the user. When being enabled to remotely operate by the instruction from the MFP 100 after establishing the communication path with the MFP 100, the first remote operation portion 251 displays an image of the operation screen received from the MFP 100 in the display unit 206. Then, the first remote operation portion 251 controls the touch panel 207B. In response to reception of a set of coordinates from the touch panel 207B, the first remote operation portion 251 specifies the position corresponding to the set of coordinates received from the touch panel 207B in the image displayed in the display unit 206. In response to specification of the set of coordinates, the first remote operation portion 251 controls the wireless LAN I/F 208 to transmit a remote operation command including the set of specified coordinates to the MFP 100. In response to disconnection of the communication path established with the MFP 100, the first remote operation portion 251 ends the task.

The second application program is a program for operating the portable information device 200 in order for the user to remotely operate the MFP 100 while the user operates the operation panel 160 of the MFP 100. Therefore, in the case where the user of the portable information device 200 remotely operates the MFP 100 with no operation of the operation panel 160 of the MFP 100 but with an operation of the remote information device 200, the first application program is started. Further, in the case where the user of the portable information device 200 operates the portable information device 200 while operating the operation panel 160 of the MFP 100 to remotely control the MFP 100, the second application program is started. Because the second application program is executed in the case where the user simultaneously operates the portable information device 200 and the MFP 100, it is required that a distance between the portable information device 200 and the MFP 100 is a predetermined distance L or less for the second remote operation portion 200 to function. Therefore, the second application program is a short-range application program.

The short-range application program is a program that assists the user who operates the operation panel 160 included in the MFP 100. More specifically, the short-range application program includes a setting program for setting a setting value in the operation screen of the MFP 100. The setting program includes a keyboard cooperation program and an address-link program for setting the data accepted in the operation unit 207 of the remote information device 200 in a region for setting the setting value of the operation screen of the MFP 100. In the case where the CPU 201 executes the keyboard cooperation program, when the second remote operation portion 253 is enabled to remotely operate by the instruction from the MFP 100 after establishing the communication path with the MFP 100, the second remote operation portion 253 displays a soft keyboard in the display unit 206, transmits the data input by the user in the operation unit 207 in accordance with the soft keyboard to the MFP 100, and transmits a remote operation command that requests the input in a region for setting the setting value of the operation screen to the MFP 100. In response to disconnection of the communication path established with the MFP 100, the second remote operation portion 253 ends the task. The second remote operation portion 253 can utilize an input function and a kanji (Chinese characters) conversion function of the remote information device 200.

Further, in the case where the CPU 201 executes the address link program, when the second remote operation portion 253 is enabled to remotely operate by the instruction from the MFP 100 after establishing the communication path with the MFP 100, the second remote operation portion 253 transmits the data of the transmission destination selected by the user from an address book including the transmission destinations of the data stored in the flash memory 203 to the MFP 100, and transmits a remote operation command that requests the input in a region for setting the setting value of the operation screen to the MFP 100. In response to disconnection of the communication path established with the MFP 100, the second remote operation portion 253 ends the task. The second remote operation portion 253 can utilize the data of the transmission destination in the data stored in the portable information device 200.

Further, the short-range application program includes an image conversion program that executes a predetermined process on the data that is treated as the target of the process by the MFP 100. In the case where the CPU 201 executes the image conversion program, when the second remote operation portion 253 is enabled to remotely operate by the instruction from the MFP 100 after establishing the communication path with the MFP 100, the second remote operation portion 253 transmits a remote operation command, which requests the transmission of the image data to the MFP 100, to the MFP 100, executes a predetermined process on the image data received from the MFP 100, and transmits a remote operation command including the data after the process to the MFP 100. The predetermined process includes a process of identifying letters in the case where the data is an image including letters, and a process of performing an image process such as a sharpening process and a color conversion process on the image, a process of combining another image with the image of the data in the case where the data is an image, and the like. Further, the predetermined process includes a process of requesting the server to execute a process based on the service provided by the server to an external server. The service provided by the server includes a service for executing the process of identifying letters in the case where the data includes letters, the process of executing the image process such as the sharpening process, the color conversion process, the process of combining another image with the image of the data on the image in the case where the data is an image, and the like. In response to disconnection of the communication path established with the MFP 100, the second remote operation portion 253 ends the task.

The short-range application program includes a remote scan program for receiving the image data scanned and output by the MFP 100 by the portable information device 200. In the case where the CPU 201 executes the remote scan program, when the second remote operation portion 253 is enabled to remotely operate by the instruction from the MFP 100 after establishing the communication path with the MFP 100, the second remote operation portion 253 transmits a remote operation command that requests the transmission, of the image data of the scanned document to the MFP 100, to the MFP 100, and stores the data received from the MFP 100 in the flash memory 203. In response to disconnection of the communication path established with the MFP 100, the second remote operation portion 253 ends the task. The second remote operation portion 253 can store the image data of the document converted into a form of electronic data in the flash memory 203.

Further, the short-range application program includes an assistance information providing program that displays a screen associated with the operation screen displayed in the display unit 161 by the MFP 100 in the display unit 206. In the case where the CPU 201 executes the assistance information providing program, when the second remote operation portion 253 is enabled to remotely operate by the instruction from the MFP 100 after establishing the communication path with the MFP 100, the second remote operation portion 253 receives screen identification information, of the operation screen displayed in the display unit 161 by the MFP 100, from the MFP 100, and displays the screen associated with the operation screen specified by the screen identification information in the display unit 206. The screen associated with the operation screen includes a help screen for explaining an operation for the operation screen. In response to disconnection of the communication path established with the MFP 100, the second remote operation portion 253 ends the task.

While the case where the CPU 201 includes the first remote operation portion 251 and the second remote operation portion 253 is described, it is not necessary that the CPU 201 always includes the first remote operation portion 251 and the second remote operation portion 253. The CPU 201 can make a transition to a first state where the first remote operation portion 251 is included but the second remote operation portion 253 is not included, a second state where the first remote operation portion 251 and the second remote operation portion 253 are included, a third state where the first remote operation portion 251 is not included but the second remote operation portion 253 is included, and a fourth state where neither the first remote operation portion 251 nor the second remote operation portion 253 is included.

For example, in the case where the user who operates the portable information device 200 allows the portable information device 200 to execute the first application program to remotely operate the MFP 100 from the portable information device 200, the CPU 201 is in the first state. The user who operates the portable information device 200 sometimes desires to utilize the function achieved by the second application program with the CPU 201 being in the first state. In this case, the user who operates the portable information device 200 starts the second application program, so that the CPU 201 enters the second state. In the case where the first state is changed to the second state, the first remote operation portion 251 that has established the communication path with the MFP 100 earlier can remotely operate the MFP 100. Although the communication path is established between the second remote operation portion 253 and the MFP 100, the second remote operation portion 253 cannot remotely operate the MFP 100. In this state, if the user gives an instruction to end the first application program to the CPU 201, the communication path between the first remote operation portion 251 that has established the communication path with the MFP 100 earlier, and the MFP 100 is disconnected, and the CPU 201 enters the third state. In the case where the second state is changed to the third state, when the second remote operation portion 253 is enabled to remotely operate by the instruction from the MFP 100, the second remote operation portion 253 remotely operates the MFP 100.

Further, the user who operates the portable information device 200 sometimes desires to utilize the function achieved by the first application program with the CPU 201 being in the third state. In this case, the user who operates the portable information device 200 starts the first application program, so that the CPU 201 enters the second state. In the case where the third state is changed to the second state, the second remote operation portion 253, which has established the communication path with the MFP 100 earlier, can remotely operate the MFP 100. Although the communication path is established between the first remote operation portion 251 and the MFP 100, the first remote operation portion 251 cannot remotely operate the MFP 100. In this state, if the user gives an instruction to end the second application program to the CPU 201, the communication path between the second remote operation portion 253, which has established the communication path with the MFP 100 earlier, and the MFP 100 is disconnected, and the CPU 201 enters the first state. In the case where the second state is changed to the first state, when the first remote operation portion 251 is enabled to remotely operate by the instruction of the MFP 100, the first remote operation portion 251 remotely operates the MFP 100.

Further, the CPU 201 can make a transition to a fifth state where two first remote operation portions 251 are included and the second remote operation portion 253 is not included, and a sixth state where the first remote operation portion 251 is not included and two second remote operation portions 253 are included.

For example, in the case where the user who operates the portable information device 200 allows the portable information device 200 to execute the first application program to remotely operate the MFP 100 from the portable information device 200, the CPU 201 is in the first state. The user who operates the portable information device 200 sometimes further desires to utilize the function achieved by the first application program with the CPU 201 being in the first state. In this case, the user who operates the portable information device 200 starts the first application program, so that the CPU 201 enters the fifth state. In the case where the first state is changed to the fifth state, the first remote operation portion 251, which has established the communication path with the MFP 100 earlier, can remotely operate the MFP 100. Although the communication path is established between the first remote operation portion 251, which has been started later, and the MFP 100, the first remote operation portion 251, which has been started later, cannot remotely operate the MFP 100. In this state, if the user gives an instruction to end the first application program, which has been started earlier, to the CPU 201, the communication path between the first remote operation portion 251, which has established the communication path with the MFP 100 earlier, and the MFP 100 is disconnected, and the CPU 201 enters the first state. In the case where the fifth state is changed to the first state, when the first remote operation portion 253, which has been started later, is enabled to remotely operate by the instruction from the MFP 100, the first remote operation portion 253, which has been started later, remotely operates the MFP 100.

Further, in the case where the user who operates the remote information device 200 allows the portable information device 200 to execute the second application program to remotely operate the MFP 100 from the portable information device 200, the CPU 201 is in the third state. The user who operates the portable information device 200 sometimes further desires to utilize the function achieved by another second application program with the CPU 201 being in the third state. In this case, the user who operates the portable information device 200 starts the other second application program, so that the CPU 201 enters the sixth state. In the case where the third state is changed to the sixth state, the second remote operation portion 253, which has established the communication path with the MFP 100 earlier, can remotely operate the MFP 100. Although the communication path is established between the second remote operation portion 253, which has been started later, and the MFP 100, the second remote operation portion 253, which has been started later, cannot remotely operate the MFP 100. In this state, if the user gives an instruction to end the second application program, which has been started earlier, the communication path between the second remote operation portion 253, which has established the communication path with the MFP 100 earlier, and the MFP 100 is disconnected, and the CPU 201 enters the third state. In the case where the sixth state is changed to the third state, when the second remote operation portion 253, which has been started later, is enabled to remotely operate by the instruction from the MFP 100, the second remote operation portion 253, which has been started later, remotely operates the MFP 100.

FIG. 5 is a block diagram showing one example of the functions of the CPU included in the MFP in the present embodiment. The functions shown in FIG. 5 are formed in the CPU 111 by execution of the remote control program stored in the ROM 113, the HDD 115, and the CD-ROM 118 by the CPU 111 included in the MFP 100.

Referring to FIG. 5, the CPU 111 includes a device-side establishing portion 51, a waiting setting portion 53, a device determination portion 55, a function detection portion 57, a distance detection portion 59, a moving direction detection portion 61, a path selection portion 63, a first disconnection portion 65, a second disconnection portion 67, a remote control portion 69, an operation authority switching portion 71, an operation acceptance portion 73, a display control portion 75, and a process execution portion 77.

The device-side establishing portion 51 controls the communication I/F unit 112 to establish a communication path with the remote operation device in response to a request from the remote operation device. When establishing the communication path with the remote operation device, the device-side establishing portion 51 outputs path identification information for identifying the established communication path to the waiting setting portion 53, the function detection portion 57, the path selection portion 63, and the distance detection portion 59. Here, the portable information devices 200, 200A, 200B may be the remote operation devices. Therefore, in response to reception of the remote operation request from any of the portable information devices 200, 200A, 200B, the device-side establishing portion 51 establishes a communication path with the device that has transmitted the remote operation request among the portable information devices 200, 200A, 200B. The device-side establishing portion 51 sometimes simultaneously establishes a plurality of communication paths with the plurality of respective portable information devices 200, 200A, 200B. For example, the device-side establishing portion 51 sometimes establishes a communication path with the portable information device 200 and establishes a communication with the portable information device 200A. Further, the device-side establishing portion 51 sometimes simultaneously establishes a plurality of communication paths with one device among the portable information devices 200, 200A, 200B. For example, the device-side establishing portion 51 sometimes establishes a communication path with the first remote operation portion 251, which is a task formed in the CPU 201 in the case where the CPU 201 included in the portable information device 200 executes the first application program, and establishes a communication path with the second remote operation portion 253, which is a task for the CPU 201 of the portable information device 200 to execute the second application program.

The path selection portion 63 selects one of the one or more communication paths that have been established by the device-side establishing portion 51 as a valid path. In the case where the device-side establishing portion 51 establishes a communication path when no other communication path has been established with any remote operation device, the path selection portion 63 selects the communication path as the valid path. The path selection portion 63 outputs the path identification information for identifying the communication path selected as the valid path to the device determination portion 55, the remote control portion 69, the waiting setting portion 53, the first disconnection portion 65 and the second disconnection portion 67.

In the case where a plurality of communication paths are established by the device-side establishing portion 51, the waiting setting portion 53 sets one or more communication paths that are not selected by the path selection portion 63 as waiting paths. Specifically, the waiting setting portion 53 receives the path identification information for identifying the communication path every time the communication path is established by the device-side establishing portion 51, and receives the path identification information of the valid path from the path selection portion 63. In the case where a new communication path is established by the device-side establishing portion 51 with the valid path being selected by the path selection portion 63, the waiting setting portion 53 sets the newly established communication path as a waiting path. The waiting setting portion 53 specifies the sequence of the waiting paths in a chronological order of establishment by the device-side establishing portion 51. With the valid path being selected by the path selection portion 63, a plurality of new communication paths are sometimes established by the device-side establishing portion 51. The waiting setting portion 53 sets the plurality of respective communication paths that are newly established by the device-side establishing portion 51 as waiting paths, and specifies the sequence of the plurality of waiting paths in a chronological order of establishment by the device-side establishing portion 51. The waiting setting portion 53 outputs sets of the path identification information and the sequence number to the path selection portion 63 and the device determination portion 55 for one or more respective waiting paths.

The device determination portion 55 receives the path identification information of the valid path from the path selection portion 63, and receives the respective sets of the path identification information and the sequence number of the one or more waiting paths from the waiting setting portion 53. In the case where receiving a plurality of sets of the path identification information and the sequence number of the waiting paths from the waiting setting portion 53, the device determination portion 55 determines whether the same waiting path, which is connected to the remote operation device that is the same as the remote operation device connected to the valid path, is present among the plurality of waiting paths. Specifically, the device determination portion 55 determines whether the device at the connection destination of the valid path and devices at the connection destinations of the one or more respective waiting paths are the same. For example, the device determination portion 55 communicates with the device at the connection destination of the valid path using the communication path set as the valid path, acquires a piece of device identification information for identifying the device at the connection destination of the valid path, communicates with the devices at the connection destinations of the waiting paths using the communication paths set as the waiting paths for every plurality of waiting paths, and acquires pieces of device identification information for identifying the devices at the connection destinations. Then, the device determination portion 55 compares the piece of device identification information acquired for the valid path and the pieces of device identification information acquired for the plurality of respective waiting paths, and determines the waiting path as the same device if the pieces of device identification information are the same. In the case where the waiting path connected to the remote operation device, which is connected to the valid path, is present among the plurality of waiting paths, the device determination portion 55 sets the waiting path connected to the remote operation device, which is connected to the valid path, as the same waiting path, and outputs the path identification information of the same waiting path to the path selection portion 63.

In response to reception of the path identification information from the device-side establishing portion 51, the function detection portion 57 detects the function executed by the device at the connection destination of the communication path specified by the path identification information. Specifically, the function detection portion 57 communicates with the device at the connection destination of the communication path using the communication path specified by the path identification information, and acquires program identification information for identifying the application program executed by the device at the connection destination to establish the communication path. The function detection portion 57 outputs a set of the path identification information and the program identification program to the path selection portion 63.

In response to reception of the path identification information from the device-side assisting portion 51, the distance detection portion 59 detects a distance between the device at the connection destination of the communication path specified by the path identification information and the MFP 100. For example, the distance detection portion 59 detects the distance from the intensity of radio waves in communicating with the device at the connection destination of the communication path using the communication path specified by the path identification information. A method for detecting the distance by the distance detection portion 59 is not limited to this. For example, the distance detection portion 59 may communicate with the device at the connection destination of the communication path using the communication path specified by the path identification information, acquire an absolute position measured by the device with GPS or the like from the device at the connection destination, and calculate the distance from the acquired absolute position of the device at the connection destination and the absolute position of the MFP 100. The distance detection portion 59 outputs a set of the path identification information and the calculated distance to the path selection portion 63, the moving direction detection portion 61, the first disconnection portion 65, and the second disconnection portion 67.

The moving direction detection portion 61 detects the moving direction of the device at the connection destination of the communication path specified by the path identification information based on the set of the path identification information and the distance received from the distance detection portion 59. Specifically, the moving direction is detected based on distances respectively included in the plurality of sets having the same piece of path identification information received from the distance detection portion 59 at different time points. In the case where the distance is decreased with an elapse of time, the moving direction detection portion 61 detects the moving direction of the device at the connection destination of the communication path specified by the path identification information as a direction moving towards the MFP 100. In the case where the distance is increased with an elapse of time, the moving direction detection portion 61 detects the moving direction of the device at the connection destination of the communication path specified by the path identification information as a direction moving away from the MFP 100. The moving direction detection portion 61 outputs a set of the path identification information and the moving direction to the path selection portion 63. A method for detecting the moving direction by the moving direction detection portion 61 is not limited to this. For example, the moving direction detection portion 61 may communicate with the device at the connection destination of the communication path using the communication path specified by the path identification information, acquires an absolute position measured by the device at the connection destination with the GPS or the like, and a moving orientation measured by the device at the connection destination with a magnetic sensor or the like, and detect the moving direction of the device at the connection destination from the position and the moving orientation of the device at the connection destination and the absolute position of the MFP 100.

In response to disconnection of the valid path, the path selection portion 63 selects one of the one or more waiting paths as a new valid path. The path selection portion 63 outputs the path identification information of the waiting path that is selected as the new valid path to the device determination portion 55, the remote control portion 69, the waiting setting portion 53, the first disconnection portion 65, and the second disconnection portion 67.

With one or more sets of the path identification information and the sequence number being input from the waiting setting portion 53, and the path identification information not being input from the device determination portion 55, in response to disconnection of the valid path, the path selection portion 63 selects the set having the lowest sequence number among the one or more sets input from the waiting setting portion 53, and selects the waiting path specified by the path identification information included in the selected set as a new valid path.

The path selection portion 63 determines whether the application program executed for the communication path by the device at the connection destination of the communication path specified by the path identification information received from the device determination portion 55 is the short-range application program. Specifically, the path selection portion 63 extracts the set including the path identification information received from the device determination portion 55 from among the one or more sets received from the function detection portion 57, and determines whether the application program specified by the program identification information included in the extracted set is the short-range application program.

With one or more sets of the path identification information and the sequence number being input from the waiting setting portion 53, the path identification information being input from the device determination portion 55, and the device at the connection destination of the communication path specified by the path identification information input from the device determination portion 55 not executing the short-range application program, in response to disconnection of the valid path, the path selection portion 63 selects the waiting path specified by the path identification information input from the device determination portion 55 from among the one or more sets input from the waiting setting portion 53 as a valid path regardless of the sequence number determined by the waiting setting portion 53.

With one or more sets of the path identification information and the sequence number being input from the waiting setting portion 53, the path identification information being input from the device determination portion 55, and the device at the connection destination of the communication path specified by the path identification information input from the device determination portion 55 executing the short-range application program, in the case where a predetermined condition is satisfied, in response to disconnection of the valid path, the path selection portion 63 selects the waiting path specified by the path identification information input from the device determination portion 55 from among the one or more sets input from the waiting setting portion 53 as a new valid path regardless of the sequence number determined by the waiting setting portion 53.

The predetermined condition includes a first condition and a second condition. If any of the first condition and the second condition is satisfied, the predetermined condition is satisfied. The first condition is that the distance between the device at the connection destination of the communication path specified by the path identification information received from the device determination portion 55 and the MFP 100, which is an image processing apparatus, is a predetermined distance L or less. The second condition is that the distance between the device at the connection destination of the communication path specified by the path identification information received from the device determination portion 55 and the MFP 100, which is an image processing apparatus, is larger than the predetermined distance L, and also a moving direction of the device at the connection destination of the communication path specified by the path identification information received from the device determination portion 55 is the direction moving towards the MFP 100, which is an image processing apparatus. The path selection portion 63 specifies the distance between the device at the connection destination of the communication path specified by the path identification information received from the device determination portion 55 and the MFP 100, which is an image processing apparatus, using the set of the path identification information and the distance received from the distance detection portion 59. Further, the path selection portion 63 specifies a moving direction of the device at the connection destination of the communication path specified by the path identification information received from the device determination portion 55 using the set of the path identification information and the direction received from the moving direction detection portion 61.

In the case where the predetermined condition is not satisfied with one or more sets of the path identification information and the sequence number being input from the waiting setting portion 53, the path identification information being input from the device determination portion 55, and the device at the connection destination of the communication path specified by the path identification information input from the device determination portion 55 executing the short-range application program, in response to disconnection of the valid path, the path selection portion 63 selects the set having the lowest sequence number among the one or more sets input from the waiting setting portion 53, and selects the waiting path specified by the path identification information included in the selected set as a new valid path.

In the case where the first condition is satisfied with one or more sets of the path identification information and the sequence number being input from the waiting setting portion 53, the path identification information being input from the device determination portion 55, and the device at the connection destination of the communication path specified by the path identification information input from the device determination portion 55 executing the short-range application program, in response to disconnection of the valid path, if the waiting path specified by the path identification information input from the device determination portion 55 is selected as a new valid path from among the one or more sets input from the waiting setting portion 53, the path selection portion 63 outputs a first monitoring instruction to the first disconnection portion 65. The first monitoring instruction includes the path identification information of the new valid path.

In the case where the second condition is satisfied with one or more sets of the path identification information and the sequence number being input from the waiting setting portion 53, the path identification information being input from the device determination portion 55, the device at the connection destination of the communication path specified by the path identification information input from the device determination portion 55 executing the short-range application program, in response to disconnection of the invalid path, if the waiting path specified by the path identification information input from the device determination portion 55 is selected as a new valid path from among the one or more sets input from the waiting setting portion 53, the path selection portion 63 outputs a second monitoring instruction to the second disconnection portion 67. The second monitoring instruction includes the path identification information of the new valid path.

The first disconnection portion 65 receives a set of the path identification information and the distance from the distance detection portion 59. In response to reception of the first monitoring instruction from the path selection portion 63, the first disconnection portion 65 monitors the distance between the MFP 100 and the device at the connection destination of the valid path specified by the path identification information included in the first monitoring instruction. In response to the distance being larger than the predetermined distance L, the first disconnection portion 65 disconnects the communication path specified by the path identification information included in the first monitoring instruction. The reason is as follows. Because a task to execute the short-range application program assists an operation of inputting in the operation panel 160, in the case where the distance between the MFP 100 and the device becomes larger than the predetermined distance L, the operation panel 160 cannot be operated, and it is considered that the user is not remotely operating the MFP 100. The user who is not remotely operating can be prevented from monopolizing the valid path for the remote operation for a long period of time.

The second disconnection portion 67 receives the set of the path identification information and the distance from the distance detection portion 59. In response to reception of the second monitoring instruction from the path selection portion 63, the second disconnection portion 67 monitors the distance between the MFP 100 and the device at the connection destination of the valid path specified by the path identification information included in the second monitoring instruction. In the case where the distance does not become the predetermined distance L or less within a predetermined time period from the time when the second monitoring instruction is received, the second disconnection portion 67 disconnects the communication path specified by the path identification information included in the second monitoring instruction. The reason is as follows. Because a task to execute the short-range application program assists an operation of inputting in the operation panel 160, in the case where the distance between the device and the MFP 100 does not become the predetermined distance L or less, the operation panel 160 cannot be operated, and it is considered that the user is not remotely operating the MFP 100. The user who is not remotely operating can be prevented from monopolizing the valid path for the remote operation for a long period of time.

Further, in response to the distance being larger than the predetermined distance L after the distance becomes the predetermined distance L or less within the predetermined time period from the time when the second monitoring instruction is received, the second disconnection portion 67 disconnects the communication path specified by the path identification information included in the second monitoring instruction. The reason is as follows. Because a task to execute the short-range application program assists an operation of inputting in the operation panel 160, in the case where the distance between the device and the MFP 100 becomes larger than the predetermined distance L, the operation panel 160 cannot be operated, and it is considered that the user is not remotely operating the MFP 100. The user who is not remotely operating can be prevented from monopolizing the valid path for the remote operation for a long period of time.

The operation authority switching portion 71 switches the operation authority for the operation panel 160 based on the path identification information of the valid path received from the path selection portion 63 and the application program executed in the device connected to the valid path. In the case where the application program executed in the device connected to the valid path is the short-range application program with the path identification information of the valid path being input from the path selection portion 63, the operation authority switching portion 71 validates the operation authority for the operation panel 160. However, in the case where the application program executed in the device connected to the valid path is not the short-range application program, the operation authority switching portion 71 invalidates the operation authority for the operation panel 160. Further, with the path identification information of the valid path not being input from the path selection portion 63, the operation authority switching portion 71 validates the operation authority for the operation panel 160.

In the case where the application program executed by the device connected to the valid path is the short-range application program with the path identification information of the valid path being input from the path selection portion 63, the operation authority switching portion 71 outputs a switch signal, indicating that the remote operation device and the operation panel 160 have the operation authority, to the operation acceptance portion 73 and the display control portion 75. In the case where the application program executed by the device connected to the valid path is not the short-range application program with the path identification information of the valid path being input from the path selection portion 63, the operation authority switching portion 71 outputs a switch signal, indicating that the remote operation device has the operation authority, to the operation acceptance portion 73 and the display control portion 75. With the path identification information of the valid path not being input from the path selection portion 63, the operation authority switching portion 71 outputs a switch signal, indicating that the operation panel 160 has the operation authority, to the operation acceptance portion 73 and the display control portion 75.

With the operation authority for the remote operation device being valid, in response to designation of a predetermined switch key among the plurality of hard keys of the hard key unit 167 of the operation panel 160 by the user, the operation authority switching portion 71 may validate the operation authority for the operation panel 160. Further, with a holder of the operation authority being switched to the touch panel 165, in response to designation of the switch key in the hard key unit 167 of the operation panel 160 by the user, the operation authority switching portion 71 may switch the holder of the operation authority to the remote operation device.

The operation acceptance portion 73 gives an instruction to display the operation screen for accepting an operation of the user to the display control portion 75, and accepts the operation of inputting in the operation unit 163 by the user in accordance with the operation screen. Specifically, the operation acceptance portion 73 outputs operation screen identification information for identifying the operation screen to the display control portion 75. In an initial stage, the operation acceptance portion 73 outputs the screen identification information of the predetermined operation screen to the display control portion 75. The initial stage includes the time when power is applied to the MFP 100, or the time when the MFP 100 is recovered from a sleep state where electric consumption is low, for example.

In the case where receiving a switch signal indicating that the operation panel 160 has the operation authority or a switch signal indicating that the remote operation device and the operation panel 160 have the operation authority from the operation authority switching portion 71, in response to reception of the screen identification information from the operation acceptance portion 73, the display control portion 75 reads out an image of the operation screen specified by the screen identification information from the HDD 115, and displays the read image of the operation screen in the display unit 161. In the case where receiving a switch signal indicating that the remote operation device has the operation authority, in response to reception of the screen identification information from the operation acceptance portion 73, the display control portion 75 reads out the image of the operation screen specified by the screen identification information from the HDD 115, outputs the read image of the operation screen to the remote control portion 69, and displays an image indicating that the remote operation is being performed in the display unit 161. In the case where the holder of the operation authority is switched to the operation panel 160, the image of the operation screen is displayed in the display unit 161. In the case where the holder of the operation authority is switched to only the remote operation device, the image indicating that the remote operation is being performed is displayed in the display unit 161. Therefore, the user can know whether the touch panel 165 is operable by viewing the image displayed in the display unit 161.

In the case where receiving the switch signal indicating that the operation panel 160 has the operation authority or the switch signal indicating that the remote operation device and the operation panel 160 have the operation authority from the operation authority switching portion 71, the operation acceptance portion 73 controls the touch panel 165. In response to reception of the set of coordinates from the touch panel 165 after outputting the screen identification information to the display control portion 75, the operation acceptance portion 73 determines an operation by the user based on the set of coordinates received from the touch panel 165.

The operation acceptance portion 73 specifies the position designated by the user in the operation screen based on the set of coordinates received from the touch panel 165. Specifically, the operation acceptance portion 73 specifies the position specified by the set of coordinates received from the touch panel 165 in the image of the operation screen displayed in the display unit 161 as the position in the operation screen designated by the user. The operation acceptance portion 73 determines an operation corresponding to the position specified in the operation screen. For example, in the case where the operation screen includes a setting button to which an operation of setting the setting value is assigned, if the position designated by the user in the operation screen is in a range of the setting button, the operation of setting the setting value is specified, and the command to set the setting value is output to the process execution portion 77. In the case where the operation screen includes an execution instruction button to which an operation of giving an instruction to execute the process is assigned, if the position designated by the user in the operation screen is in the range of the execution instruction button, the execution instruction operation is specified, and the command to execute the type of the process specified by the button is output to the process execution portion 77. Further, in the case where the operation screen includes a transition button to which an operation of switching the display to another operation screen is assigned, if the position designated by the user in the operation screen is in the range of the transition button, the operation acceptance portion 73 specifies the operation of making a transition of the screen, and outputs the screen identification information associated with the transition button to the display control portion 75.

The remote control portion 69 receives the path identification information of the valid path from the path selection portion 63, and receives an image of an operation screen from the display control portion 75. The remote control portion 69 controls the communication I/F unit 112 to transmit the image of the operation screen received from the display control portion 75 to the remote operation device via the communication path specified by the path identification information. Further, during a period in which the communication path specified by the path identification information of the valid path received from the path selection portion 63 is established, the remote control portion 69 transmits the image of the operation screen to the remote operation device every time the image of the operation screen is received from the display control portion 75.

The case where the remote control portion 69 transmits the image of the operation screen to the remote operation device is the case where the operation authority switching portion 71 validates the operation authority for only the remote operation device. In the portable information device 200, which is a remote operation device that receives the image of the operation screen, the first remote operation portion 251, which is a task to execute the first application program, sometimes returns the set of coordinates indicating the position in the image of the operation screen, as described above. In response to reception of the set of coordinates from the portable information device 200 by the communication I/F unit 112, the remote control portion 69 outputs the set of received coordinates to the operation acceptance portion 73.

In the case where receiving the switch signal indicating that the remote operation device has the operation authority from the operation authority switching portion 71, in response to reception of the remote operation command including the set of coordinates from the remote control portion 69, the operation acceptance portion 73 does not control the touch panel 165, but determines the operation by the user based on the set of coordinates included in the remote operation command received from the remote control portion 69 similarly to the case where the set of coordinates is received from the touch panel 165. The operation acceptance portion 73 specifies the position designated by the user in the operation screen based on the set of coordinates included in the remote operation command received from the remote control portion 69. Specifically, the operation acceptance portion 73 specifies the position specified by the set of coordinates included in the remote operation command received from the remote control portion 69 in the image of the operation screen as the position in the operation screen designated by the user, and determines the operation corresponding to the position specified in the operation screen.

In the case where the operation authority switching portion 71 sets the operation authority for the remote operation device and the operation panel 160 as valid, the remote information device 200, which is a remote operation device, executes the second application program. In the case where executing the second application program, the portable information device 200, which is a remote operation device, sometimes returns the remote operation command. In response to reception of the remote operation command from the remote operation device by the communication I/F unit 112, the remote control portion 69 outputs the received remote operation command to the operation acceptance portion 73.

In the case where receiving the switch signal indicating that the remote operation device and the operation panel 160 have the operation authority from the operation authority switching portion 71, in response to reception of the remote operation command from the remote control portion 69, the operation acceptance portion 73 specifies the process in accordance with the remote operation command and outputs a command to execute the specified process to the process execution portion 77. Further, in the case where receiving the switch signal indicating that the remote operation device and the operation panel 160 have the operation authority from the operation authority switching portion 71, in response to reception of the set of coordinates from the touch panel 165 after outputting the screen identification information to the display control portion 75, the operation acceptance portion 73 determines the operation by the user based on the set of coordinates received from the touch panel 165.

The process execution portion 77 controls the communication I/F unit 112, the facsimile unit 116, the HDD 115, the external storage device 117, the automatic document feeder 120, the document scanning unit 130, the image forming unit 140, the paper feed unit 150, and the post-processing unit 155 to execute a process. In response to reception of a command to execute a process from the operation acceptance portion 73, the process execution portion 77 executes the process in accordance with the command. In response to reception of a command to set a setting value from the operation acceptance portion 73, the process execution portion 77 executes the process of setting the setting value. Further, in response to reception of the command to execute the process from the operation acceptance portion 73, the process execution portion 77 executes the type of the process specified by the command. One example of the process executed by the process execution portion 77 includes a scanning process, a copying process, a printing process, a facsimile transmitting receiving process and the like. The scanning process is a process of outputting an image of a document scanned by the document scanning unit 130 to at least one of the HDD 115, the external storage device 117, the communication I/F unit 112. The copying process is a process of forming an image of the document scanned by the document scanning unit 130 on a sheet of paper supplied from the paper feed unit 150 to the image forming unit 140. The printing process is a process of forming an image of the print data received from a computer connected to the network via the communication I/F unit 112 and an image of the data stored in the HDD 115 or the external storage device 117 on a sheet of paper supplied from the paper feed unit 150 to the image forming unit 140. The facsimile transmitting process is a process of transmitting an image of the facsimile data to the facsimile unit 116. The facsimile receiving process is a process of outputting an image of the externally received facsimile data to at least one of the image forming unit 140, the HDD 115, the external storage device 117, and the communication I/F unit 112.

Figure 6:
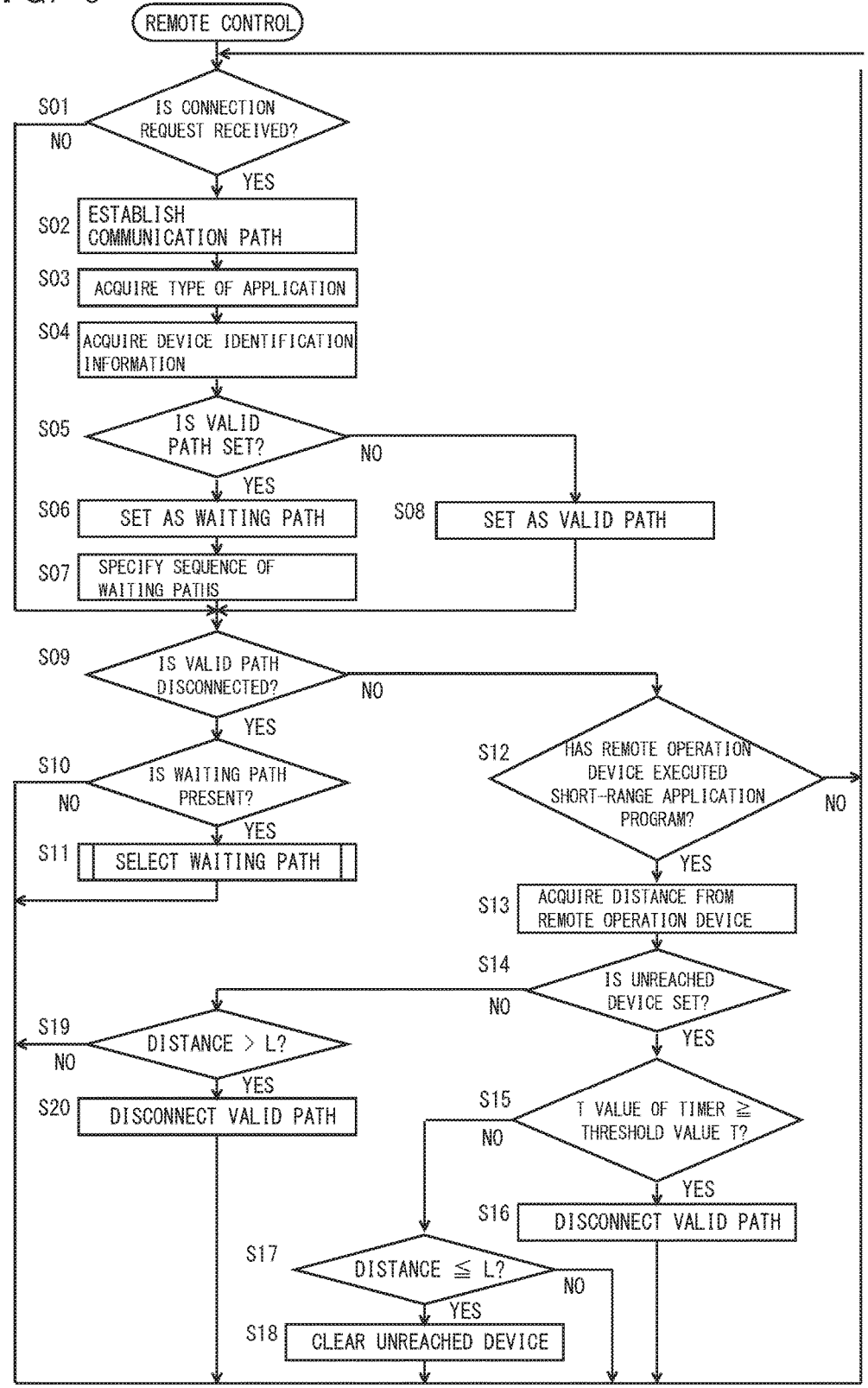
FIG. 6 is a flow chart showing one example of a flow of a remote control process in the present embodiment.

FIG. 6 is a flow chart showing one example of a flow of the remote control process in the present embodiment. The remote control process is a process executed by the CPU 111 when the CPU 111 included in the MFP 100 executes a remote control program stored in the ROM 113, the HDD 115, and the CD-ROM 118. Referring to FIG. 6, the CPU 111 determines whether a connection request has been received (step S01). Whether the communication I/F unit 112 has received the connection request from any of the portable information devices 200, 200A, 200B is determined. The process waits until the connection request is received (NO in the step S01). If the connection request is received (YES in the step S01), the process proceeds to the step S02.

In the step S02, the communication paths are established between the MFP 100 and the devices that have transmitted the connection requests. In the next step S03, the types of the application programs executed in the devices with which the CPU 111 have established the communication paths are acquired, and the process proceeds to the step S04. Specifically, the CPU 111 acquires the types of the application programs executed by the devices from the devices by communicating with the devices at the connection destinations via the communication paths established in the step S02.

In the step S04, pieces of device identification information for identifying the devices with which the CPU 111 have established the connection paths are acquired, and the process proceeds to the step S05. Specifically, the CPU 111 acquires the pieces of device identification information of the devices from the devices by communicating with the devices at the connection destinations via the communication paths established in the step S02.

In the step S05, whether the valid path is set is determined. The valid path is any one of the communication paths established in the step S02, and set in the step S08, described below. If the valid path is set, the process proceeds to the step S06. If not, the process proceeds to the step S08. In the step S08, one of the communication paths established in the step S02 is set as the valid path, and the process proceeds to the step S09. Although it is not shown in FIG. 6, the CPU 111 executes the process in accordance with the remote control command received via the connection path set as the valid path from the device connected by the communication path by communicating with the device connected by the connection path.

In the step S06, the other connection paths established in the step S02 are set as the waiting paths, and the process proceeds to the step S07. In the step S07, the CPU 111 specifies the sequence of the communication paths set as the waiting paths, and the process proceeds to the step S09. The CPU 111 specifies the sequence in a chronological order of the establishment of the communication paths.

In the step S09, whether the valid path has been disconnected is determined. If the valid path is disconnected, the process proceeds to the step S10. If not, the process proceeds to the step S12.

In the step S10, whether the waiting path is present is determined. If the waiting path is present, the process proceeds to the step S11. If not, the process proceeds to the step S01. In the step S11, a waiting path selection process is executed, and the process returns to the step S01.

Figure 7:
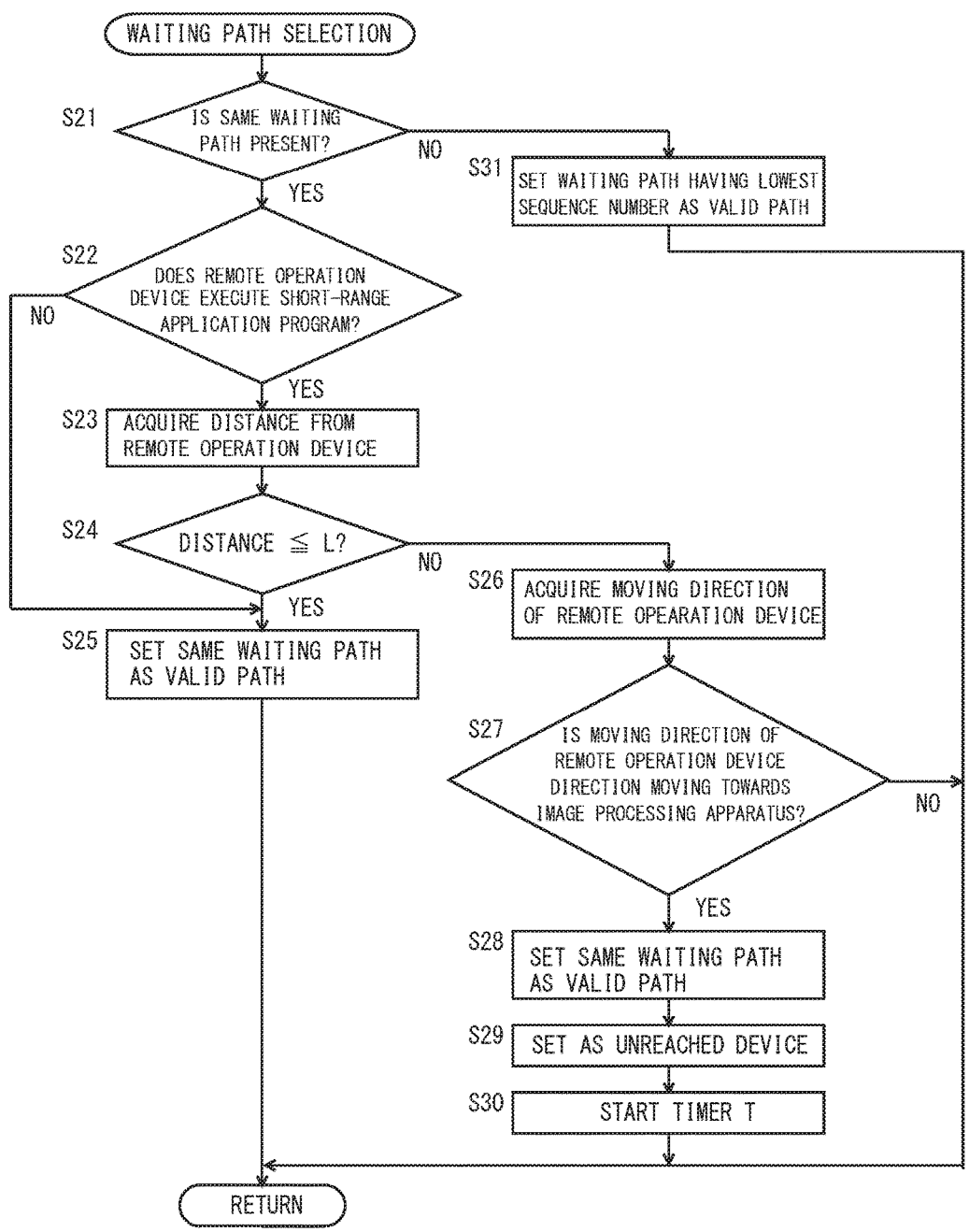
FIG. 7 is a flow chart showing one example of a flow of a waiting path selection process.

FIG. 7 is a flow chart showing one example of a flow of the waiting path selection process. The waiting path selection process is a process executed in the step S11 of FIG. 6. Referring to FIG. 7, the CPU 111 determines whether the same waiting path is present (step S21). The same waiting path is the communication path connected to the remote operation device, which is connected to the valid path, among the waiting paths. In the step S04 of FIG. 6, the device identification information of the remote operation device connected by the communication path is acquired every time the communication path is established. The CPU 111 compares the piece of device identification information of the remote operation device connected by the valid path with one or more pieces of device identification information of the one or more remote operation devices respectively connected to the one or more waiting paths, and extracts the waiting path connected to the remote operation device having the same piece of device identification information as the remote operation device connected by the valid path from among the one or more waiting paths as the same waiting path. In the case where extracting the waiting path connected to the remote operation device specified by the same piece of device identification information as the piece of device identification information of the remote operation device connected by the valid path, the CPU 111 determines that the same waiting path is present. If such a waiting path is not extracted, the CPU 111 determines that the same waiting path is not present. If the same waiting path is present, the process proceeds to the step S22. If not, the process proceeds to the step S31.

In the step S22, whether the remote operation device connected to the same waiting path executes the short-range application program is determined. Whether the application program executed by the remote operation device connected by the same waiting path is the short-range application program is determined based on the type of the application acquired in the step S03 of FIG. 6. If the short-range application program is executed in the remote operation device connected by the same waiting path, the process proceeds to the step S23. If not, the process proceeds to the step S25.

In the step S23, the distance between the remote operation device connected by the same waiting path and the MFP 100 is acquired. Then, whether the acquired distance is a threshold value L or less is determined (step S24). If the distance between the MFP 100 and the remote operation device connected by the same waiting path is the threshold value L or less, the process proceeds to the step S25. If not, the process proceeds to the step S26. In the step S25, the same waiting path is set as the valid path, and the process returns to the remote control process. On the condition that the distance between the MFP 100 and the remote operation device that executes the short-range application program is the threshold value L or less, the same waiting path is set as the valid path. The reason is as follows. Because the remote operation device that executes the short-range application program is operated together with the operation panel 160, in the case where the distance between the remote operation device and the MFP 100 is the threshold value L or less, the user can operate the MFP 100 together with the remote operation device that executes the short-range application program. Thus, in the case where the application program to be executed by the remote operation device is switched from the application program executed by the remote operation device in order to remotely operate the MFP 100 to another short-range application program during a period in which the user is remotely operating the MFP 100 by using the remote operation device, the user can continuously remotely operate MFP 100 by using the remote operation device.

In the step S26, a moving direction of the remote operation device connected by the same waiting path is acquired. For example, the distances between the MFP 100 and the remote operation device connected to the same waiting path at different time points are acquired. In the case where the distance between the remote operation device and the MFP 100 is decreased, it is determined that the moving direction of the remote operation device is a direction moving towards the MFP 100. Further, in the case where the distance between the MFP 100 and the remote operation device is increased, it is determined that the moving direction of the remote operation device is different from the direction moving towards the MFP 100. Further, absolute positions of the remote operation device connected by the same waiting path at different time points are acquired, and the moving direction is acquired from the absolute positions of the remote operation device acquired at the different time points.

In the next step S27, whether the moving direction of the remote operation device connected by the same waiting path is a direction moving towards the image processing apparatus is determined. If the moving direction of the remote operation device connected by the same waiting path is the direction moving towards the image processing apparatus, the process proceeds to the step S28. If not, the process returns to the remote control process. In the step S28, the same waiting path is set as the valid path, and the process proceeds to the step S29. The reason is as follows. In the case where the application program to be executed by the remote operation device is switched from the application program executed by the remote operation device in order to remotely operate the MFP 100 to another different short-range application program during a period in which the user who uses the remote operation device connected by the same waiting path is remotely operating the MFP 100 using the remote operation device, if the remote operation device is moving towards the MFP 100, the user can continuously remotely operate the MFP 100 using the remote operation device. At a time point at which the distance between the MFP 100 and the remote operation device connected by the same waiting path becomes the threshold value L or less, the user who uses the remote operation device connected by the same waiting path can simultaneously operate the remote operation device and the operation panel 160.

In the next step S29, the remote operation device connected to the same waiting path is set as an unreached device, and the process proceeds to the step S30. In the step S30, the CPU 111 starts a timer T, and the process returns to the remote control process. The timer T measures the time that has elapsed since the remote operation device connected by the valid path is set as the unreached device. On the one hand, in the step S31, the waiting path having the lowest sequence number among the one or more waiting paths is set as the valid path, and the process returns to the remote control process.

Returning to FIG. 6, in the step S12, whether the short-range application program is executed in the remote operation device connected by the valid path is determined. Whether the application program executed by the remote operation device connected by the valid path is the short-range application program is determined based on the type of the application acquired in the step S03. If the short-range application program is executed in the remote operation device connected by the valid path, the process proceeds to the step S13. If not, the process returns to the step S01.

In the step S13, the distance between the MFP 100 and the remote operation device connected by the valid path is acquired. In the next step S14, whether the remote operation device connected by the valid path is set as the unreached device is determined. If the remote operation device is set as the unreached device, the process proceeds to the step S15. If not, the process proceeds to the step S19. In the step S15, whether a value of the timer T is a threshold value T or more is determined. The threshold value T is a limit time period from the time when the remote operation device connected by the valid path is set as the unreached device to the time when the remote operation device approaches the MFP 100 to be within the distance L from the MFP 100. If the value of the timer T is the threshold value T or more, the process proceeds to the step S16. If not, the process proceeds to the step S17.

In the step S16, the valid path is disconnected, and the process returns to the step S01. In the case where the distance between the MFP 100 and the remote operation device does not become the threshold value L or less within the threshold value T, which is the limit time period, from the time when the remote operation device is set as the unreached device (NO in the step S15, and NO in the step S17), the process returns to the step S01. The reason is as follows. Because the remote operation device that executes the short-range application program is operated together with the operation panel 160, in the case where the distance between the remote operation device set as the unreached device and the MFP 100 does not become the threshold value L or less within the threshold value T, which is the limit time period, the user cannot operate the MFP 100 together with the remote operation device that executes the short-range application program. Thus, such a user is prevented from monopolizing the MFP 100 to remotely operate. Thus, the time period during which one user monopolizes the MFP 100 to remotely operate can be decreased as much as possible, and a waiting time period for another user to wait to remotely operate the MFP 100 can be decreased.

In the step S17, whether the distance acquired in the step S13 is the threshold value L or less is determined. If the distance between the MFP 100 and the remote operation device connected to the valid path is the threshold value L or less, the process proceeds to the step S18. If not, the process returns to the step S01. In the step S18, the setting of the unreached device for the remote operation device connected to the valid path is cleared, and the process returns to the step S01. In the case where the remote operation device is set as the unreached device, the distance between the remote operation device and the MFP 100 is larger than the threshold value L at a time point at which the remote operation device is set as the unreached device. It is necessary that the distance between the remote operation device that executes the short-range application program and the MFP 100 is the threshold value L or less. Therefore, in the case where the distance between the remote operation device and the MFP 100 becomes the threshold value L or less within the threshold value T, which is the limit time period, from the time when the remote operation device is set as the unreached device, if the application program to be executed by the remote operation device is switched from the application program executed by the remote operation device in order to remotely operate the MFP 100 to another short-range application program during a period in which the user is remotely operating the MFP 100 using the remote operation device, the user can continuously remotely operate the MFP 100 using the remote operation device by clearing of the setting of the unreached device.

In the step S19, whether the distance acquired in the step S13 is larger than the threshold value L is determined. If the distance between the MFP 100 and the remote operation device connected by the valid path is larger than the threshold value L, the process proceeds to the step S20. If not, the process returns to the step S01. In the step S20, the valid path is disconnected, and the process returns to the step S01. In the case where the distance between the MFP 100 and the remote operation device that executes the short-range application program is larger than the threshold value L, the valid path is disconnected. The reason is as follows. Because the remote operation device that executes the short-range application program is operated together with the operation panel 160, in the case where the distance between the remote operation device and the MFP 100 is too large, the user cannot operate the MFP 100 together with the remote operation device that executes the short-range application program. Thus, the time period for one user to monopolize the MFP 100 to remotely operate can be decreased as much as possible, and a waiting time period for another user to wait to remotely operate the MFP 100 can be decreased.

Figure 8:
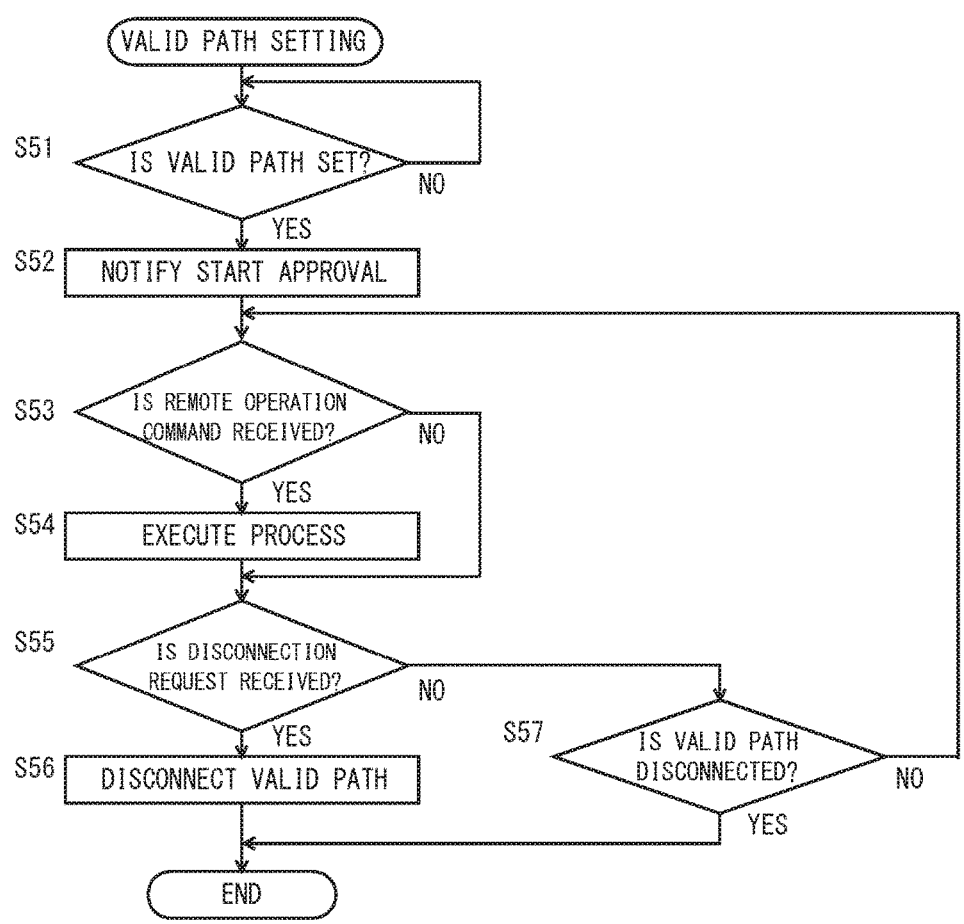
FIG. 8 is a flow chart showing one example of a flow of a valid path setting process.

FIG. 8 is a flow chart showing one example of a flow of a valid path setting process. The valid path setting process is a process executed by the CPU 111 when the CPU 111 included in the MFP 100 executes the remote control program stored in the ROM 113, the HDD 115, the CD-ROM 118, and executed concurrently with the remote control process shown in FIGS. 6 and 7. Referring to FIG. 8, the CPU 111 determines whether the valid path has been set (step S51). The process waits until the valid path is set (NO in the step S51). If the valid path is set (YES in the step S51), the process proceeds to the step S52. In other words, the valid path setting process is a process executed on the condition that the remote control process is executed and the valid path is set.

In the step S52, start approval is notified to the remote operation device connected to the valid path, and the process proceeds to the step S53. In the step S53, whether the remote operation command has been received from the remote operation device connected to the valid path is determined. If the remote operation command is received, the process proceeds to the step S54. If not, the process proceeds to the step S55. In the step S54, the process is executed in accordance with the remote operation command received in the step S53, and the process proceeds to the step S55. In the step S55, whether a request to disconnect the valid path has been received from the remote operation device connected to the valid path is determined. If the request to disconnect the valid path is received, the process proceeds to the step S56. If not, the process proceeds to the step S57. In the step S56, the valid path is disconnected, and the process ends. In the step S57, whether the valid path has been disconnected is determined. Here, in the case where the valid path is disconnected when the CPU 111 executes the remote operation process shown in FIGS. 6 and 7, it is determined that the valid path is disconnected. If the valid path is disconnected, the process ends. If not, the process returns to the step S53.

Figure 9:
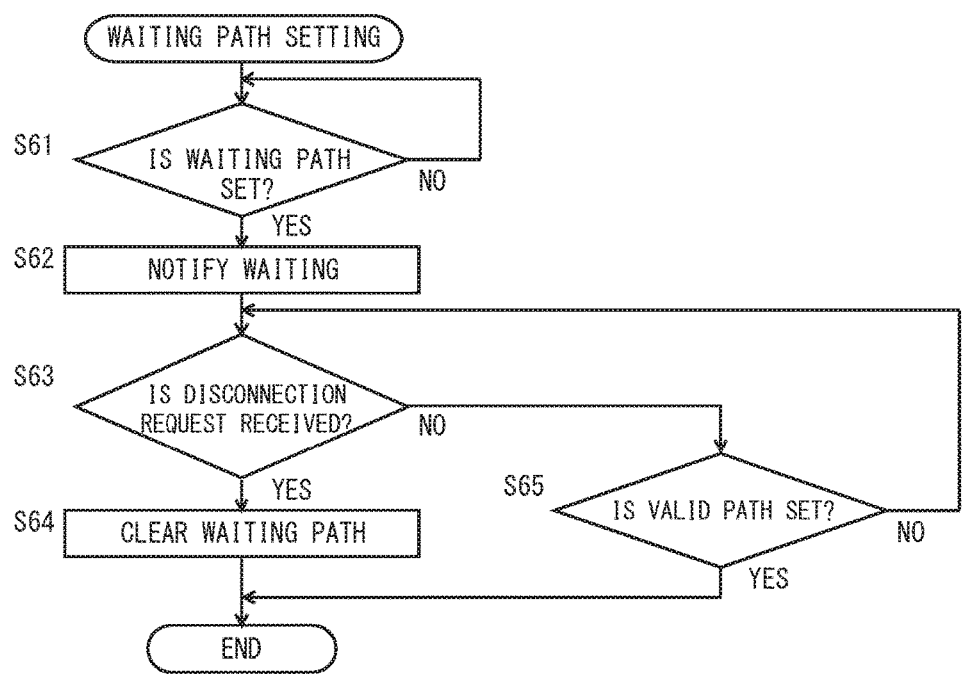
FIG. 9 is a flow chart showing one example of a flow of a waiting path setting process.

FIG. 9 is a flow chart showing one example of a flow of a waiting path setting process. The waiting path setting process is a process executed by the CPU 111 when the CPU 111 included in the MFP 100 executes the remote control program stored in the ROM 113, the HDD 115, the CD-ROM 118, and is executed concurrently with the remote control process shown in FIGS. 6 and 7. Referring to FIG. 9, the CPU 111 determines whether the waiting path has been set (step S61). The process waits until the waiting path is set (NO in the step S61). If the waiting path is set (YES in the step S61), the process proceeds to the step S62. In other words, the waiting path setting process is a process executed on the condition that the remote control process is executed and the waiting path is set.

In the step S62, the waiting is notified to the remote operation device connected to the waiting path, and the process proceeds to the step S63. In the step S63, whether the request to disconnect the waiting path has been received from the remote operation device connected to the waiting path is determined. If the request to disconnect the waiting path is received, the process proceeds to the step S64. If not, the process proceeds to the step S65. In the step S64, the waiting path is cleared, and the process ends. Specifically, the communication path as the waiting path is deleted from the waiting line. In the step S65, whether the waiting path has been set as the valid path is determined. If the waiting path is set as the valid path, the process ends. If not, the process returns to the step S63. In the case where the waiting path is set as the valid path by execution of the remote operation process shown in FIGS. 6 and 7, the process ends.

FIG. 10 is a diagram for explaining a specific example of the remote control process executed in the MFP in a chronological order. The case where a user A who operates the portable information device 200 and a user B who operates the portable information device 200A attempt to remotely operate the MFP 100 is described here as an example. In the diagram, the portable information device 200 is shown as a first portable information device, and the portable information device 200A is shown as a second portable information device. Referring to FIG. 10, a time flow is shown from the top to the bottom in the longitudinal direction in a chronological order. Initially, the MFP 100 is not being remotely operated by any remote operation device. The user A operates the first portable information device 200 to start the first application program. The first portable information device 200 executes the first application program, and transmits a connection request to the MFP 100. In response to reception of the connection request from the first portable information device 200, the MFP 100 establishes the communication path with the first portable information device 200. In this stage, the communication path established between the MFP 100 and the first potable information device 200 is referred to as a first communication path. In the case where establishing the first communication path, the MFP 100 sets the first communication path as the valid path, and notifies the first portable information device 200 of the start approval via the first communication path. In response to notification of the start approval, the first portable information device 200 is enabled to remotely operate the MFP 100. Specifically, in response to reception of the operation by the user A, a task, which is formed in the CPU 201 in the case where the CPU 201 included in the first portable information device 200 executes the first application program, transmits the remote operation command to the MFP 100, and the MFP 100 executes the process in accordance with the received remote operation command.

With the first communication path being set as the valid path by the MFP 100, the user B operates the second portable information device 200A to start the first application program. The second portable information device 200A transmits the connection request to the MFP 100 in the case where executing the first application program. In response to reception of the connection request from the second portable information device 200A, the MFP 100 establishes the communication path with the second portable information device 200B. In this stage, the communication path established between the MFP 100 and the second portable information device 200 is referred to as a second communication path. In the case where the MFP 100 establishes the second communication path, because the first communication path is set as the valid path, the MFP 100 sets the second communication path as the waiting path, and notifies the second portable information device 200A of the waiting via the second communication path. In this case, because the second communication path is the communication path first established among the waiting paths, the lowest sequence number is specified for the second communication path. In the case where being notified of the waiting, the second portable information device 200A is disabled to remotely operate the MFP 100 until the next start approval is notified from the MFP 100.

Next, the user A operates the first portable information device 200 to start the second application program. The first portable information device 200 transmits the connection request to the MFP 100 in the case where executing the second application program. In response to reception of the connection request from the first portable information device 200, the MFP 100 establishes a communication path with the first portable information device 200. In this stage, the communication path established between the MFP 100 and the first portable information device 200 is referred to as a third communication path. In the case where the MFP 100 establishes the third communication path, because the first communication path is set as the valid path, the MFP 100 sets the third communication path as the waiting path, and notifies the first portable information device 200 of the waiting via the third communication path. In this case, because the third communication path is the communication path that has been established after the second communication path among the waiting paths, the second lowest sequence number is specified. In the case where being notified of the waiting, a task, which is formed in the CPU 201 in the case where the CPU 201 included in the first portable information device 200 executes the second application program, is disabled to remotely operate the MFP 100 until the next start approval is notified from the MFP 100.

Then, the user A operates the first portable information device 200 to end the execution of the started first application program. When an instruction to end the execution of the first application program is given, the task, which is formed in the CPU 201 in the case where the CPU 201 included in the first portable information device 200 executes the first application program, transmits a disconnection request to the MFP 100 via the first communication path. In response to reception of the disconnection request from the first portable information device 200 via the first communication path, the MFP 100 disconnects the first communication path. Therefore, the user A of the first portable information device 200 can remotely operate the MFP 100 during the period L1 by using the first portable information device 200 that executes the first application program.

Further, because the disconnected first communication path is set as the valid path, the MFP 100 selects one of the first-place waiting path (the waiting path being given the first place in the sequence), and the second-place waiting path (the waiting path being given the second place in the sequence). In this case, because the second-place waiting path is connected to the first portable information device 200, which had been connected to the disconnected first connection path, the MFP 100 selects the second-place waiting path not the first-place waiting path. Then, the MFP 100 sets the second-place waiting path as the valid path, and notifies the first portable information device 200 of the start approval via the second-place waiting path. In response to notification of the start approval, a task, which is formed in the CPU 201 in the case where the CPU 201 included in the first portable information device 200 executes the second application program, is enabled to remotely operate the MFP 100. Specifically, in response to acceptance of the operation by the user A, the task, which is formed in the CPU 201 in the case where the CPU 201 included in the first remote information device 200 executes the second application program, transmits the remote operation command to the MFP 100, and the MFP 100 executes the process in accordance with the received remote operation command. Therefore, the user A of the first portable information device 200 can continuously remotely operate the MFP 100 by using the first portable information device 200 that executes the second application program after remotely operating the MFP 100 by using the first portable information device 200 that executes the first application program.

Next, the user A operates the first portable information device 200 to end the execution of the started second application program. When an instruction to end the execution of the second application program is given, the task, which is formed in the CPU 201 in the case where the CPU 201 included in the first portable information device 200 executes the second application program, transmits the disconnection request to the MFP 100 via the third communication path. In response to reception of the disconnection request from the first portable information device 200 via the third communication path, the MFP 100 disconnects the third connection path. Therefore, the user A of the first portable information device 200 can remotely operate the MFP 100 during a period L2 by using the first portable information device 200 that executes the second application program.

Further, because the disconnected third communication path is set as the valid path, the MFP 100 selects the first-place waiting path, sets the first-place waiting path as the valid path, and notifies the second portable information device 200A of the start approval via the first-place waiting path. In response to notification of the start approval, the second portable information device 200A can remotely operate the MFP 100. Specifically, in response to acceptance of the operation by the user B, the task, which is formed in the CPU 201 in the case where the CPU 201 included in the second portable information device 200A executes the first application program, transmits the remote operation command to the MFP 100, and the MFP 100 executes the process in accordance with the received remote operation command. Therefore, the user B of the second portable information device 200A can remotely operate the MFP 100 during a period L3 until an instruction to end the first application program is given by using the second portable information device 200A that executes the first application program.

As described above, the MFP 100 in the present embodiment functions as the image processing apparatus. With the first communication path established between the MFP 100 and the first portable information device 200 being selected as the valid path, in response to establishment of the second communication path between the MFP 100 and the second portable information device 200A, the MFP 100 sets the second communication path as the first-place waiting path. Thereafter, in response to establishment of the third communication path between the MFP 100 and the first portable information device 200, the MFP 100 sets the third communication path as the second-place waiting path. In response to disconnection of the valid path, the MFP 100 gives priority to the third communication path connected to the first portable information device 200, which is the device at the connection destination of the first communication path, over the second communication path having the lower number in the sequence, and selects the third communication path as the valid path. Therefore, in the case where the first communication path and the third communication path are established between the MFP 100 and the first portable information device 200, when the first communication path is disconnected after being selected as the valid path, because the MFP 100 gives priority to the third communication path over the second communication path, and selects the third communication path as the valid path, the MFP 100 can be continuously remotely operated by the first portable information device 200.

Further, in the case where the application program executed by the first portable information device 200 for the third communication path is the short-range application program, on the condition that the first portable information device 200 is present within the distance L from the MFP 100, the third communication path is selected as the valid path after the first communication path is disconnected. Therefore, it is possible to decrease the time period during which one portable information device monopolizes the remote control of the MFP 100 as much as possible by restricting the case where the first portable information device 200 can continuously remotely operate the MFP 100.

Further, the MFP 100 disconnects the third communication path in response to the distance between the MFP 100 and the first portable information device 200 being larger than the distance L after selecting the third communication path as the valid path. Because the user who operates the first portable information device 200 that executes the second application program cannot remotely operate the MFP 100, it is possible to avoid the state where the MFP 100 is not remotely operated and prevent the MFP 100 from being monopolized by the first portable information device 200.

Further, even in the case where the first portable information device 200 is present within a distance larger than the distance L from the MFP 100, if the moving direction of the first portable information device 200 is the direction of moving towards the MFP 100, the third communication path is selected as the valid path after the first communication path is disconnected. Therefore, when the predetermined time period has elapsed, the first portable information device 200 moves to a position within the range of the distance L from the MFP 100, and the MFP 100 can be remotely operated. Thus, the MFP 100 can be continuously remotely operated by the first portable information device 200.

However, in the case where the first portable information device 200 does not move to a position in the range of the distance L from the MFP 100 before a predetermined time period elapses, the third communication path is disconnected. Therefore, in the case where the first portable information device 200 cannot be remotely operate the MFP 100 even after the predetermined time period has elapsed, the MFP 100 can be prevented from being monopolized.

Further, in response to the distance between the MFP 100 and the first portable information device 200 being larger than the distance L after the third communication path is selected as the valid path, the third communication path is disconnected. Because the user who operates the first portable information device 200 that executes the second application program cannot remotely operate the MFP 100, the state where the MFP 100 is not remotely operated can be avoided, and the MFP 100 can be prevented from being monopolized by the first portable information device 200.

While the remote control system 1 has been described in the above-mentioned embodiment, the present invention may of course be identified as the remote control method for allowing the MFP 100 to execute the remote control process shown in FIGS. 6 to 9, and the remote control program that allows the CPU 111 controlling the MFP 100 to perform the remote control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control system that includes an image processing apparatus and a plurality of remote operation devices capable of remotely operating the image processing apparatus, wherein
 a hardware processor of each of the plurality of remote operation devices
  establishes a communication path with the image processing apparatus,
  remotely operates the image processing apparatus by executing a first application program and transmitting a remote operation command using the established communication path, and
  remotely operates the image processing apparatus by executing a second application program and transmitting a remote operation command using the established communication path different from the communication path used for the first application program, and
 a hardware processor included in the image processing device
  establishes a communication path with any of the plurality of remote operation devices,
  selects any one of the one or more established communication paths as a valid path,
  executes a process in accordance with a remote operation command received via the valid path,
  in response to establishment of new communication paths different from the valid path with the valid path being selected, sets the new communication paths as waiting paths to which sequence numbers are supplied in a chronological order of establishment of the communication paths,
  in the case where the plurality of waiting paths are present, determines whether a same waiting path to which a remote operation device that is the same as a remote operation device connected to the valid path is connected is present among the plurality of waiting paths, and
  in the case where it is determined that the same waiting path is present, in response to disconnection of the valid path, selects the same waiting path as a valid path regardless of the sequence numbers supplied to the plurality of waiting paths.

2. An image processing apparatus capable of being remotely operated by a plurality of remote operation devices, wherein
 a hardware processor included in the image processing apparatus
  establishes a communication path with any of the plurality of remote operation devices,
  selects any one of the one or more established communication paths as a valid path,
  executes a process in accordance with a remote operation command received via the valid path,
  in response to establishment of new communication paths different from the valid path with the valid path being selected, sets the new communication paths as waiting paths to which sequence numbers are supplied in a chronological order of establishment of the communication paths,
  in the case where the plurality of waiting paths are present, determines whether a same waiting path to which a remote operation device that is the same as a remote operation device connected to the valid path is connected is present among the plurality of waiting paths, and
  in the case where it is determined that the same waiting path is present, in response to disconnection of the valid path, selects the same waiting path as a valid path regardless of the sequence numbers supplied to the plurality of waiting paths.

3. The image processing apparatus according to claim 2, wherein
 the hardware processor
  further detects an application program which a remote operation device connected by the established communication path among the plurality of remote operation devices executes for the communication path, and
  in the case where an application program detected as an application program executed for the same waiting path is a predetermined program, on the condition that a predetermined condition is satisfied, select the same waiting path as a valid path regardless of the sequence numbers supplied to the plurality of waiting paths.

4. The image processing apparatus according to claim 3, wherein
 the hardware processor further detects a distance from any of the plurality of remote operation devices, and
 the predetermined condition includes a first condition that a distance from a remote operation device connected by the detected same waiting path is a predetermined distance or less.

5. The image processing apparatus according to claim 4, wherein
 the hardware processor further detects a moving direction of any of the plurality of remote operation devices, and
 the predetermined condition includes, in the case where the application program detected as the application program executed for the same waiting path is the predetermined program, a second condition that a distance from a remote operation device connected by the same waiting path is larger than a predetermined distance, and that a moving direction of the remote operation device connected by the same waiting path is a direction moving towards the image processing apparatus.

6. The image processing apparatus according to claim 5, wherein
 the hardware processor, in the case where the second condition is satisfied, and a distance from a remote operation device connected by a valid path does not become the predetermined distance or less before a predetermined time period elapses from a time when the same waiting path is selected as the valid path, further disconnects the valid path.

7. The image processing apparatus according to claim 5, wherein
the hardware processor, in response to a distance from a remote operation device connected by a valid path becoming larger than the predetermined distance after the distance from the remote operation device connected by the valid path becomes the predetermined distance or less, further disconnects the valid path.

8. The image processing apparatus according to claim 3, wherein
the hardware processor, in the case where an application program detected as an application program executed for the valid path is a predetermined program, in response to a distance from a remote operation device connected by the valid path being larger than a predetermined distance, further disconnects the valid path.

9. The image processing apparatus according to claim 3, wherein
the hardware processor, in the case where the predetermined condition is not satisfied, selects one of the plurality of waiting paths in accordance with the sequence numbers of the waiting line after the valid path is disconnected.

10. The image processing apparatus according to claim 3, wherein
the hardware processor, in the case where it is determined that the same waiting path is not present, further selects one of the plurality of waiting paths in accordance with the sequence numbers supplied to the waiting paths after the valid path is disconnected.

11. A remote control method performed by an image processing apparatus capable of being remotely operated by a plurality of remote operation devices, comprising:
a device-side establishing step of establishing a communication path with any of the plurality of remote operation devices;
a path selection step of selecting any one of one or more communication paths established in the device-side establishing step as a valid path;
a remote control step of executing a process in accordance with a remote operation command received via the valid path;
a waiting setting step of, with a valid path being selected in the path selection step, in response to establishment of new communication paths different from the valid path in the device-side establishing step, setting the new communication paths as waiting paths to which sequence numbers are supplied in a chronological order of establishment of the communication paths; and
a device determination step of, in the case where a plurality of waiting paths set in the waiting setting step are present, determining whether a same waiting path to which a remote operation device that is the same as a remote operation device connected to the valid path is connected is present among the plurality of waiting paths, wherein
the path selection step includes, in the case where it is determined that the same waiting path is present, in response to disconnection of the valid path, selecting the same waiting path as a valid path regardless of the sequence numbers supplied to the plurality of waiting paths.

12. A non-transitory computer-readable recording medium encoded with a remote control program executed by a computer controlling an image forming apparatus which is capable of being remotely operated by a plurality of remote operation devices, wherein
the remote control program causes the computer to execute:
a device-side establishing step of establishing a communication path with any of the plurality of remote operation devices;
a path selection step of selecting any one of one or more communication paths established in the device-side establishing step as a valid path;
a remote control step of executing a process in accordance with a remote operation command received via the valid path;
a waiting setting step of, with a valid path being selected in the path selection step, in response to establishment of new communication paths different from the valid path in the device-side establishing step, setting the new communication paths as waiting paths to which sequence numbers are supplied in a chronological order of establishment of the communication paths; and
a device determination step of, in the case where the plurality of waiting paths set in the waiting setting step are present, determining whether a same waiting path to which a remote operation device that is the same as a remote operation device connected to the valid path is connected is present among the plurality of waiting paths, and
the path selection step includes, in the case where it is determined that the same waiting path is present, in response to disconnection of the valid path, selecting the same waiting path as a valid path regardless of the sequence numbers supplied to the plurality of waiting paths.

13. The non-transitory computer-readable recording medium according to claim 12, wherein
the remote control program causes the computer to further execute a function detection step of detecting an application program, which a remote operation device connected by a communication path established in the device-side establishing step among the plurality of remote operation devices executes for the communication path, wherein
the path selection step includes, in the case where an application program detected as an application program executed for the same waiting path in the function detection step is a predetermined program, on the condition that a predetermined condition is satisfied, selecting the same waiting path as a valid path regardless of the sequence numbers supplied to the plurality of waiting paths after the valid path is disconnected.

14. The non-transitory computer-readable recording medium according to claim 13, wherein
the remote control program causes the computer to further execute a distance detection step of detecting a distance from any of the plurality of remote operation devices, wherein
the predetermined condition includes a first condition that a distance from a remote operation device connected by the same waiting path that has been detected in the distance detection step is a predetermined distance or less.

15. The non-transitory computer-readable recording medium according to claim 14, wherein
the remote control program causes the computer to further execute a moving direction detection step of detecting a moving direction of any of the plurality of remote operation devices, wherein
the predetermined condition includes, in the case where the application program detected as the application program executed for the same waiting path in the function detection step is the predetermined program, a second condition that a distance from a remote operation device connected by the same waiting path that has been detected in the distance detection step is larger than a predetermined distance, and that a moving direction of the remote operation device connected by the same waiting path that has been detected in the moving direction detection step is a direction moving towards an image processing apparatus.

16. The non-transitory computer-readable recording medium according to claim 15, wherein
the remote control program causes the computer to execute, in the case where the second condition is satisfied, and a distance from a remote operation device connected by a valid path detected in the distance detection step does not become the predetermined distance or less within a predetermined time period from a time when the same waiting path is selected as the valid path in the path selection step, a second disconnection step of disconnecting the valid path.

17. The non-transitory computer-readable recording medium according to claim 15, wherein
the second disconnection step includes, in response to a distance from a remote operation device connected by the valid path detected in the distance detection step becoming larger than the predetermined distance after the distance from the remote operation device connected by the valid path detected in the distance detection step becomes the predetermined distance or less, a step of disconnecting the valid path.

18. The non-transitory computer-readable recording medium according to claim 13, wherein
the remote control program causes the computer to execute, in the case where an application program detected as an application program executed for the valid path in the function detection step is a predetermined program, in response to a distance from a remote operation device connected by the valid path detected in the distance detection step becoming larger than a predetermined distance, a first disconnection step of disconnecting the valid path.

19. The non-transitory computer-readable recording medium according to claim 13, wherein
the path selection step includes, in the case where the predetermined condition is not satisfied, a step of selecting one from among the plurality of waiting paths in accordance with the sequence numbers of the waiting line after the valid path is disconnected.

20. The non-transitory computer-readable recording medium according to claim 13, wherein
the path selection step includes, in the case where it is determined that the same waiting path is not present, a step of selecting one from among the plurality of waiting paths in accordance with the sequence numbers supplied to the waiting paths after the valid path is disconnected.

* * * * *